US008116568B2

(12) United States Patent  
Daidoh

(10) Patent No.: US 8,116,568 B2  
(45) Date of Patent: Feb. 14, 2012

(54) IMAGE PROCESSING APPARATUS, IMAGE READING APPARATUS, IMAGE DATA OUTPUT PROCESSING APPARATUS, AND IMAGE PROCESSING METHOD

(75) Inventor: Takahiro Daidoh, Hirakata (JP)

(73) Assignee: Sharp Kabushiki Kaisha, Osaka (JP)

( * ) Notice: Subject to any disclaimer, the term of this patent is extended or adjusted under 35 U.S.C. 154(b) by 564 days.

(21) Appl. No.: 12/395,913

(22) Filed: Mar. 2, 2009

(65) Prior Publication Data

US 2009/0220154 A1 Sep. 3, 2009

(30) Foreign Application Priority Data

Mar. 3, 2008 (JP) ................................ 2008-052337

(51) Int. Cl.  
*G06K 9/18* (2006.01)

(52) U.S. Cl. ...................................... 382/182; 382/192

(58) Field of Classification Search .................. 382/182  
See application file for complete search history.

(56) References Cited

U.S. PATENT DOCUMENTS

| 5,687,252 | A | 11/1997 | Kanno et al. | |
|---|---|---|---|---|
| 5,799,115 | A | 8/1998 | Asano et al. | |
| 6,208,744 | B1 * | 3/2001 | Ishige et al. | 382/100 |
| 6,226,402 | B1 * | 5/2001 | Katsuyama | 382/171 |
| 6,327,387 | B1 * | 12/2001 | Naoi et al. | 382/190 |
| 6,434,270 | B1 * | 8/2002 | Ohara et al. | 382/178 |
| 7,003,159 | B2 * | 2/2006 | Yamaai | 382/199 |
| 7,039,235 | B1 * | 5/2006 | Katsuyama | 382/195 |
| 2001/0016069 | A1 * | 8/2001 | Katsuyama | 382/199 |
| 2001/0031085 | A1 * | 10/2001 | Katsuyama | 382/202 |
| 2001/0041006 | A1 * | 11/2001 | Katsuyama | 382/190 |
| 2002/0025072 | A1 * | 2/2002 | Yamaai | 382/199 |
| 2007/0160295 | A1 * | 7/2007 | Wang et al. | 382/199 |
| 2007/0165280 | A1 * | 7/2007 | Yago | 358/2.99 |
| 2008/0123141 | A1 * | 5/2008 | Noguchi | 358/2.1 |
| 2009/0220154 | A1 * | 9/2009 | Daidoh | 382/182 |

FOREIGN PATENT DOCUMENTS

| JP | 8-255236 A | 10/1996 |
|---|---|---|
| JP | 8-317197 A | 11/1996 |
| JP | 2007-193446 A | 8/2007 |

* cited by examiner

*Primary Examiner* — Sath V Perungavoor  
(74) *Attorney, Agent, or Firm* — Birch, Stewart, Kolasch & Birch, LLP

(57) ABSTRACT

A ruled-line extraction section can be performed with high precision by providing a main-scanning ruled-line extraction section for determining whether a target pixel of binary image data of a document image is a black pixel or a white pixel, for counting the number of black pixels connected one after another upstream in a main scanning direction with respect to the target pixel of the binary image data and for, when the target pixel of the binary image data is a black pixel and when a value counted for the target pixel is not less than a main-scanning run determination threshold value that has been set in advance, generating ruled-line image data by correcting, to pixel values corresponding to black pixels, pixel values of a predetermined number of pixels connected to the target pixel upstream in the main scanning direction.

10 Claims, 18 Drawing Sheets

VERTICAL LINE

| 0 | 1 | 0 |
|---|---|---|
| 0 | 1 | 0 |
| 0 | 1 | 0 |

HORIZONTAL LINE

| 0 | 0 | 0 |
|---|---|---|
| 1 | 1 | 1 |
| 0 | 0 | 0 |

BINIMG (MONOCHROME/BINARY)
ONSET OF BLUR

RESULT OF MAIN-SCANNING
RUN DETERMINATION PROCESS

MAIN-SCANNING RULED-LINE EXTRACTION SECTION
OUTPUT IMAGE

FIG. 17 (a)

DETECTION OF VERTICAL LINE

| -1 | 1 | -1 |
|----|---|----|
| -1 | 1 | -1 |
| -1 | 1 | -1 |

FIG. 17 (b)

DETECTION OF HORIZONTAL LINE

| -1 | -1 | -1 |
|----|----|----|
| 1  | 1  | 1  |
| -1 | -1 | -1 |

IMAGE PROCESSING APPARATUS, IMAGE READING APPARATUS, IMAGE DATA OUTPUT PROCESSING APPARATUS, AND IMAGE PROCESSING METHOD

This Nonprovisional application claims priority under U.S.C. §119(a) on Patent Application No. 052337/2008 filed in Japan on Mar. 3, 2008, the entire contents of which are hereby incorporated by reference.

FIELD OF THE INVENTION

The present invention relates to a technique for extracting, in accordance with image data of a document image, a ruled-line image contained in the document image.

BACKGROUND OF THE INVENTION

In recent years, it has been proposed that various optional functions involving the processing of input image data as digital signals be applied to digital image processing apparatuses such as digital color multifunction printers.

An example of the optional functions is an OCR function of extracting a character image from a document image and converting the extracted character data into text data. Generally, the OCR function is performed by performing a segmentation process on a document image, detecting regions of concatenation of edge-detected pixels extracted as a feature of a character portion, i.e., runs of edge-detected pixels extending in main scanning and sub-scanning directions within the document image and thereby extracting a rectangular region considered to be a character, analyzing a distribution of edge-detected pixels within the extracted rectangular region and thereby identifying the character, and converting the character into a character code assigned to that character. For this reason, the process of extracting a rectangular character portion has a decisive influence on the precision of the OCR process.

It should be noted here that the conventional process of extracting a rectangular character region presumes, basically, that there are no run of edge-detected pixels extending in the main scanning or sub-scanning direction between characters in the document image, i.e., that there is no character joined to another.

However, in cases where the document image contains a ruled-line image such an underline drawn under a character portion, a line surrounding a character portion, or a line extending in the main scanning and sub-scanning directions, the ruled-line image is judged as a run of edge-detected pixels as with a character or image portion. Therefore, a landscape or portrait image area constituted by a plurality of characters based on the ruled image is extracted as a single rectangular character area in the process of extracting a rectangular character area. This causes a remarkable decrease in precision of a character analysis process in the image area, thus causing a remarkable decrease in precision of the OCR function.

Accordingly, the OCR function requires a ruled-line removal process (ruled-line extraction process) as a pre-process preceding the process of extracting a rectangular character area, thus requiring that the precision of the ruled-line extraction process be improved for the purpose of enhancing the precision of the OCR function.

Another example of the optional functions is a document matching process. For example, Patent Document 1 discloses a technique for extracting ruled-line information from a document image and performing a matching process on a ledger sheet or the like with use of the extracted ruled-line information. Even such a technique for performing a matching process with use of ruled-line information requires that the precision of the ruled-line extraction process be improved for the purpose of enhancing the precision of the matching process.

It should be noted, for example, that Patent Document 2 discloses, as a technique relating to the ruled-line extraction process, a technique for scanning a document image in a first direction, detecting as a "first ruled line" a segment whose length is not less than a threshold value, and then detecting as a "second ruled line" a segment, belonging to a group of segments each extending in a second direction from any point on the segment, whose length is not less than a threshold value.

(Patent Document 1) Japanese Unexamined Patent Application Publication No. 255236/1996 (Tokukaihei 8-255236; published on Oct. 1, 1996)

(Patent Document 2) Japanese Unexamined Patent Application Publication No. 193446/2007 (Tokukai 2007-193446; published on Aug. 2, 2007)

(Patent Document 3) Japanese Patent No. 3779741 (published on Feb. 2, 1996)

(Patent Document 4) Japanese Unexamined Patent Application Publication No. 094805/2002 (Tokukai 2002-094805; published on Mar. 29, 2002)

According to the technique of Patent Document 2, however, only a ruled line connected to a "first ruled line" is extracted as a "second ruled line"; therefore, a ruled line, if any, isolated from a "first ruled line" is not extracted.

Further, according to the technique of Patent Document 2, it is necessary to scan a document image in various directions; therefore, it is necessary for a detecting device to contain a frame buffer memory in which image data of the entire document image is stored. This causes an increase in circuit size of the detecting device.

SUMMARY OF THE INVENTION

The present invention has been made in view of the foregoing problems, and it is an object of the present invention to provide an image processing apparatus, an image processing method, an image reading apparatus, and an image data output processing apparatus each capable of performing a ruled-line extraction process with high precision.

In order to solve the foregoing problems, an image processing apparatus of the present invention is an image processing apparatus for extracting, in accordance with binary image data of a document image, a ruled-line image contained in the document image, the image processing apparatus including: a pixel value determination section for determining whether a target pixel of the binary image data is a black pixel or a white pixel; a counting section for counting the number of black pixels connected one after another upstream in a main scanning direction with respect to the target pixel of the binary image data; and a ruled-line image data generation section for, when the target pixel of the binary image data is a black pixel and when a value counted for the target pixel is not less than a main-scanning run determination threshold value that has been set in advance, generating ruled-line image data by correcting, to pixel values corresponding to black pixels, pixel values of a predetermined number of pixels connected to the target pixel upstream in the main scanning direction.

According to the foregoing arrangement, the pixel value determination section determines whether a target pixel of the binary image data is a black pixel or a white pixel, and the counting section counts the number of black pixels connected one after another upstream in a main scanning direction with respect to the target pixel of the binary image data. Then, when the target pixel of the binary image data is a black pixel and when a value counted for the target pixel is not less than a main-scanning run determination threshold value that has been set in advance, the ruled-line image data generation section generates ruled-line image data by correcting, to pixel values corresponding to black pixels, pixel values of a predetermined number of pixels connected to the target pixel upstream in the main scanning direction.

This makes it possible that even when a ruled line extending in the main scanning has a blur, a break, or the like due to a reading error or the like caused at the time of image reading, ruled-line image data is prepared with the blur, the break, or the like made up for. That is, a ruled-line image supposed to be a single ruled line but fragmented due to a reading error or the like can be corrected to be a single ruled-line image. This makes it possible to perform a ruled-line extraction process with high precision. Further, since it is not necessary to scan the document image in various directions as in the case of the technique of Patent Document 2, it is possible to make a reduction in circuit size of an image processing apparatus in comparison with the arrangement of Patent Document 2.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 15(a) and 15(b) are explanatory diagrams each showing an example of a filter factor for use in a filter process that is performed in the ruled-line information correction section provided in the ruled-line extraction section shown in FIG. 1.

FIGS. 17(a) and 17(b) are explanatory diagrams each showing an example of a filter factor for use in cases where an edge image is extracted from input image data in the image processing apparatus (image reading apparatus, image data output processing apparatus) shown in FIG. 2.

DESCRIPTION OF THE EMBODIMENTS

Embodiment 1

An embodiment of the present invention is described. The present embodiment describes an example where the present invention is applied to a digital multifunction printer provided with an OCR function. However, the present invention is not limited to such a target of application. The present invention can be applied to any image processing apparatus that extracts a ruled-line image contained in a document image.

1. Overall Arrangement of a Digital Color Multifunction Printer 1

Figure 2:
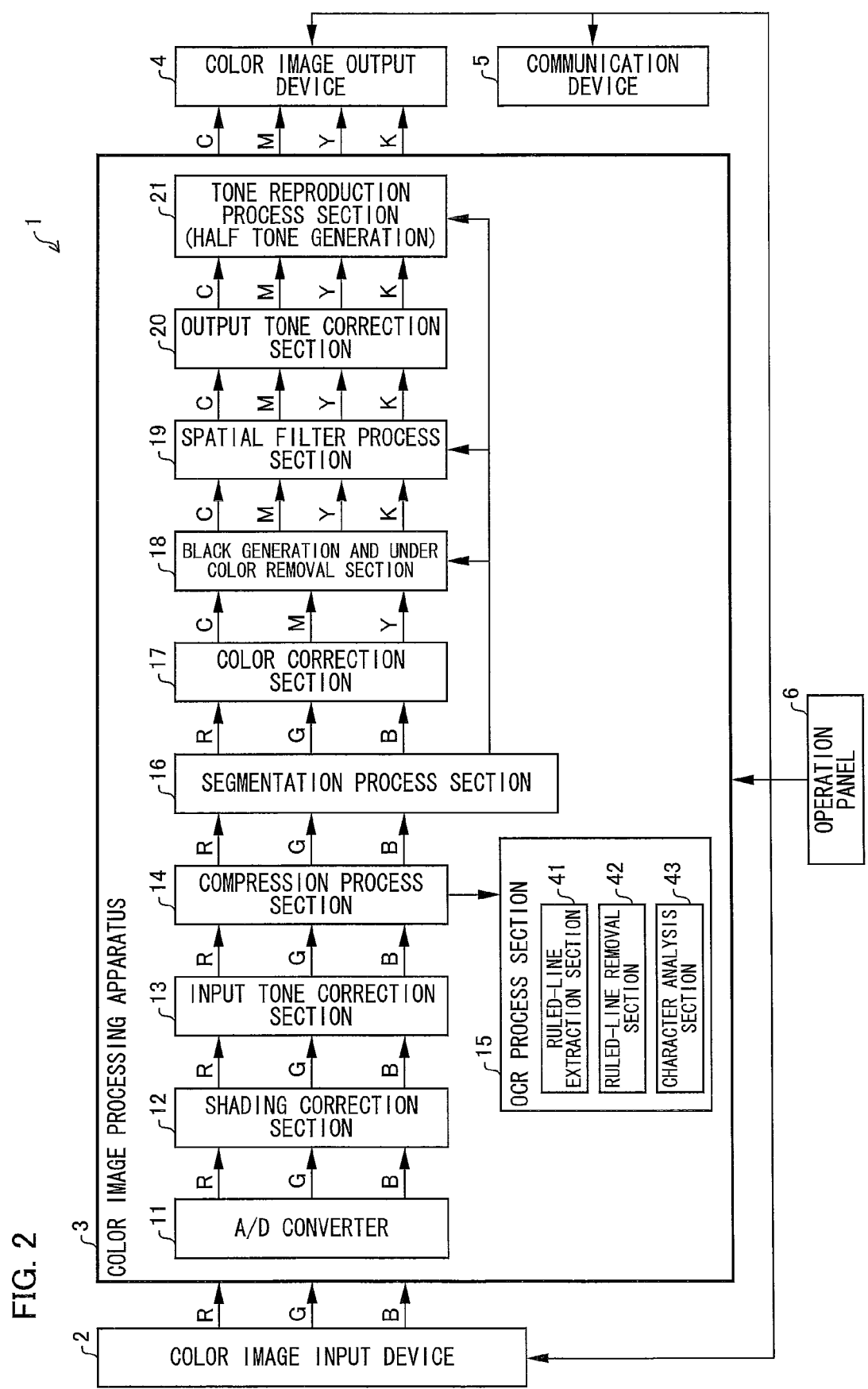
FIG. 2 is a block diagram schematically showing an arrangement of an image processing apparatus (image reading apparatus, image data output processing apparatus) according to an embodiment of the present invention.

FIG. 2 is a block diagram schematically showing an arrangement of a digital multifunction printer (image processing apparatus, image reading apparatus, image data output processing apparatus) 1 according to the present embodiment. As shown in FIG. 2, the digital multifunction printer 1 includes a color image input device 2, a color image processing apparatus 3, a color image output device 4, a communication device 5, and an operation panel 6.

The color image input device (image sensing section) 2 generates image data by reading an image of a document and outputs the generated image data to the color image processing apparatus 3. The color image input device 2 is composed, for example, of a light source for irradiating a document with scanning light and a scanner (not shown), such as a CCD (charge-coupled device), for converting optical information into an electrical signal.

The color image processing apparatus (image processing apparatus) 3 performs various processes on analog signals inputted from the color image input device 2, converts the analog signals into signals that can be processed by the color image output device 4, and then outputs the signals to the color image output device 4.

As shown in FIG. 2, the color image processing apparatus 3 includes an A/D converter 11, a shading correction section 12, an input tone correction section 13, a compression process section 14, an OCR process section 15, a segmentation process section 16, a color correction section 17, a black generation and under color removal section 18, a spatial filter process section 19, an output tone correction section 20, and a tone reproduction process section 21. Analog signals outputted from the color image input device 2 to the color image processing apparatus 3 are sent to the A/D converter 11, the shading correction section 12, the input tone correction section 13, the compression process section 14, the segmentation process section 16, the color correction section 17, the black generation and under color removal section 18, the spatial filter process section 19, the output tone correction section 20, and the tone reproduction process section 21 in this order in the color image processing apparatus 3. Ultimately, the analog signals are outputted to the color image output device 4 as CMYK digital color signals.

The A/D (analog/digital) converter 11 converts analog RGB signals into digital RGB signals.

The shading correction section 12 removes, from digital RGB signals sent from the A/D converter 11, various distortions produced in an illumination system, an image focusing system, and an image sensing system of the color image input apparatus 2.

The input tone correction section 13 produces a proper color balance of RGB signals (RGB reflectance signals) from which various distortions have been removed by the shading correction section 12, and at the same time, converts the RGB signals into signals, such as density (pixel value) signals, which can be easily processed by the color image processing apparatus 3. The input tone correction section 13 also removes background density and adjusts image quality such as contrast.

The compression process section 14 performs a compression process on RGB signals finished with an input tone correction process, and stores compressed image data temporarily in storage means (not shown) such as a hard disk. The compressed image data stored in the storage means is read out appropriately in accordance with the operation of each component of the color image processing apparatus 3. For example, in cases where a scan to e-mail mode has been selected on the operation panel 6, the compressed image data is attached to a mail, and the mail is transmitted to a set destination via the communication device 5. In cases where no compression process is performed, the compression process section 14 outputs the RGB signals to the subsequent segmentation process section 16 without any modification as inputted from the input tone correction section 13. Further, the compression process section 14 extracts an image of a character or line drawing (inclusive of a ruled line) from input image data, binarizes the extracted image of the character or line drawing, and then outputs the binarized image to the OCR process section 15. It should be noted that the compression process section 14 will be detailed later.

The OCR process section 15 includes a ruled-line extraction section 41, a ruled-line removal section 42, and a character analysis section 43. The ruled-line extraction section 41 extracts an image of a ruled line from binarized image data obtained by binarizing an image of a character or line drawing and inputted from the compression process section 14. The ruled-line removal section 42 removes the image of the ruled line from the binarized image data. The character analysis section 43 analyzes, in accordance with the binarized image data from which the image of the ruled line has been removed, a character represented by the image data, and then sends a result of the analysis to a main control section. It should be noted that whether or not a character recognition process is performed is determined in accordance with an instruction from a user, for example, via the operation panel 6. The OCR process section 15 will be detailed later.

The segmentation process section 16 separates pixels of an input image into a text region, a halftone dot region, and a photograph (continuous tone) region in accordance with RGB signals. On the basis of a result of the separation, the segmentation process section 16 outputs, to the color correction section 17, the black generation and under color removal section 18, the spatial filter process section 19, and the tone reproduction process section 21, a segmentation class signal indicating which region a pixel belongs to. The segmentation process section 16 also outputs the input signals to the subsequent color correction section 17 without any modification as outputted from the compression process section 14.

The color correction section 17 removes color impurity on the basis of spectral characteristics of CMY (C: Cyan, M: Magenta, and Y: Yellow) color materials including an unnecessary absorption component, in order to realize faithful color reproduction.

The black generation and under color removal section 18 performs (i) a black generation process of generating a black (K) signal from three color (CMY) signals finished with color correction and (ii) an under-color removal process of generating new CMY signals by removing, from the original CMY signals, the K signal obtained by the black generation process. As a result, the three CMY signals are converted into four CMYK signals.

The black generation process is not particularly limited in method, and it is possible to use various conventional publicly-known methods. For example, it is possible to use a method (commonly-used method) for black generation by skeleton black. According to this method, the black generation and under color removal process is represented as:

$$K' = f\{\min(c,m,y)\}$$

$$C' = C - \alpha K'$$

$$M' = M - \alpha K'$$

$$Y' = Y - \alpha K'$$

where $y = f(x)$ is the input-output characteristics of a skeleton curve, C, M, and Y are data to be inputted, C', M', Y', and K' are data to be outputted, and a ($0 < \alpha < 1$) is the rate of UCR (under color removal).

With the use of a digital filter, the spatial filter process section 19 performs a spatial filter process on image data received in the form of CMYK signals from the black generation and under color removal section 18, on the basis of a segmentation class signal. In the spatial filter process, the spatial filter process section 18 corrects a spatial frequency characteristic, so as to reduce blur or granularity deterioration in an output image. As with the spatial filter process section 18, the tone reproduction process section 21 performs a predetermined process on the image data in the form of the CMYK signals on the basis of the segmentation class signal.

For example, in a text region into which pixels have been separated by the segmentation process section 16, the spatial filter process section 19 strongly emphasizes a high frequency component in an edge enhancement process of a spatial filter process, in order to improve reproducibility of a black text or a color text in particular. Concurrently, the tone reproduction process section 21 selects either a binarization process or a multi-level dithering process on a high-resolution screen suitable for reproducing the high frequency component.

In a halftone dot region into which pixels have been separated by the segmentation process section 16, the spatial filter process section 19 performs a low pass filter process of removing an input halftone dot component. The output tone correction section 20 performs an output tone correction process of converting a signal such as a density signal into a halftone dot area rate that is characteristics of the color image output device 4. Subsequently, the tone reproduction process section 21 performs a tone reproduction process (half tone generation) so that, ultimately, an image is segmented into pixels and each tone of the pixels can be reproduced. In a photograph region into which pixels have been separated by the segmentation process section 16, the binarization process or the multi-level dithering process is performed on a screen suitable for tone reproduction.

Image data finished with each of the aforementioned processes is stored in a storage device (not shown). The image data is read out from the storage device at a predetermined timing and inputted to the color image output device 4.

The color image output device 4 outputs, onto a recording medium (e.g., a sheet of paper), the image data inputted from the color image processing apparatus 3. The color image output apparatus 4 is not particularly limited in arrangement, and for example, can be realized by an electrophotographic or ink-jet color image output device.

The communication device 5 is constituted, for example, by a modem or a network card. The communication device 5 communicates with another apparatus connected to a network (e.g., a personal computer, a server, other digital multi-function printer, a facsimile and the like) via a network card, a LAN cable, and the like.

It should be noted that the communication device 5 transmits image data as follows: The communication device 5 performs a transmission procedure, thereby securing a state where transmission can be performed. Then, the communication device 5 reads out, from a memory, image data compressed in a predetermined format (image data scanned by a scanner), performs a necessary process such as conversion of the compression format, and then transmits the image data in sequence via a communication line.

Further, the communication device 5 receives image data as follows: The communication device 5 performs a communication procedure, and at the same time, receives image data from a source communication device and inputs the image data to the color image processing apparatus 3. The image data thus received is subjected to a predetermined process such as a decoding process, a rotation process, a resolution conversion process, output tone correction, and a tone reproduction process by the color image processing apparatus 3, and the image data thus processed is outputted by the color image output device 4. It should be noted that the image data received may be stored in a storage device (not shown) and the image data stored may be read out by the color image processing apparatus 3 as needed to be subjected to the predetermined process.

The operation panel 6 is constituted, for example, by a display section (not shown) such as a liquid crystal display and setting buttons (not shown). The operation panel 6 causes the display section to display information corresponding to an instruction from a main control section (not shown) of the digital color multifunction printer 1 and transmits, to the main control section, information inputted by a user with use of the setting buttons. A user can input a processing request (e.g., a processing mode (copy, printing, transmission, editing, and the like), the number of images to be processed (the number of images to be copied, the number of images to be printed), a destination of input image data, and the like) with respect to the image data via the operation panel 6.

The main control section is composed, for example, of a CPU (central processing unit) and the like. The main control section controls the operation of each component of the digital color multifunction printer 1 in accordance with a program or various data stored in a ROM (not shown) or the like, information entered via the operation panel 6, or the like.

2. Arrangement of the Compression Process Section 14

Figure 3:
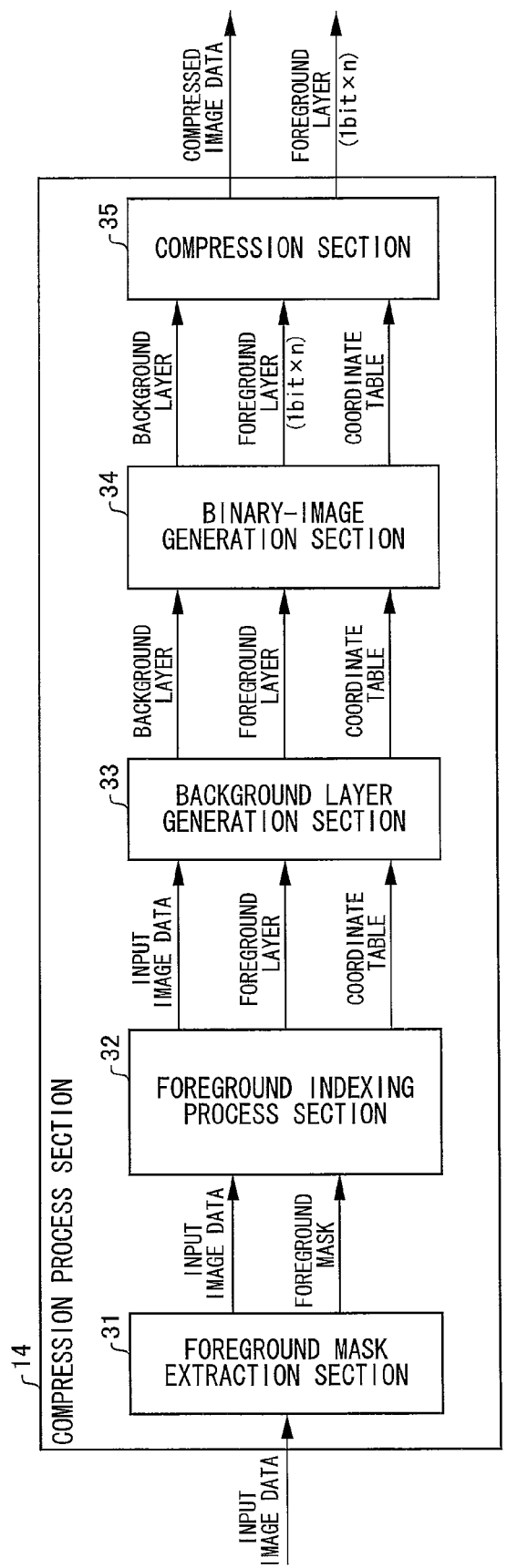
FIG. 3 is a block diagram showing an arrangement of a compression process section provided in the image processing apparatus shown in FIG. 2.

FIG. 3 is a block diagram showing an arrangement of the compression process section 14. As shown in FIG. 3, the compression process section 14 includes a foreground mask extraction section 31, a foreground indexing process section 32, a background layer generation section 33, a binary-image generation section 34, and a compression section 35.

The foreground mask extraction section 31 extracts an image of a character or line drawing (inclusive of a ruled line) as a foreground mask from a document image contained in input image data inputted from the input tone correction section 13, and then outputs the input image data and the extracted foreground mask to the foreground indexing process section 32. The foreground mask extraction is not particularly limited in method, and it is possible to use a conventional publicly-known method. For example, it is possible to use a method disclosed in Patent Document 3. According to this method, each pixel of a document image is scanned, and the luminance value of the pixel is differentiated. Then, a location where a positive derivative value and a negative derivative value are obtained is defined as an edge site, and a range from the appearance of the positive derivative value to the appearance of the negative derivative value is extracted as a character/line-drawing image (foreground mask).

The foreground indexing process section 32 generates an index image by indexing, in accordance with the color of each pixel, the foregoing mask inputted from the foreground mask extraction section 31, generates a foreground layer representing the index image, and generates a coordinates table (foreground index color table) in which each font color of the foreground layer, the coordinates of each font-color region (e.g., the coordinates of a point at which the x- and y-coordinates of each font-color region are smallest or largest), and the number of pixels belonging to each index image have been stored in association with one another. Then, the foreground indexing process section 32 outputs the input image data, the foreground layer, and the coordinates table to the background layer generation section 33.

The term "index image" refers to an image obtained by extracting, from the input image data, a color specified with a color palette prepared in advance. An index image has only a color specified with a color palette corresponding to the index image.

The method for generating an index image is not particularly limited, and it is possible to use a conventional publicly-known method. For example, it is possible to use a method disclosed in Patent Document 4. According to this method, first, it is determined for each pixel of the foreground mask (each foreground pixel) whether or not the color of the foreground pixel has already been stored in the foreground index color table. Then, in cases where it is determined that the color has already been stored, the color is assigned an index value that is closest in color in the foreground index color table. On the other hand, in cases where it is determined that the color of the foreground pixel has not been stored, the color is assigned a new index value and then stored in the foreground index color table. This process is repeated for all the foreground pixels, with the result that the foregoing mask is indexed. Further, a line is similarly indexed, too.

In order to improve the compression rate of a background layer that is obtained by removing the character/line-drawing image (foreground mask) from the document image, the background layer generation section 33 generates a background layer by removing the foreground layer from the input image data, and then outputs the foreground layer, the background layer, and the coordinates table to the binary-image generation section 34. For example, the foreground pixels (pixels constituting the foreground layer) are compensated for by background pixels (pixels constituting the background layer) surrounding the foreground pixels. That is, with reference to the background pixels, surrounding the foreground pixels, which are not foreground pixels, the foreground pixels are compensated for with use of the average of the respective values of these background pixels (i.e., replaced with the average). It should be noted that in cases where foreground pixels (within a predetermined reference range (e.g., 5×5 pixels)) are not surrounded by background pixels that are not foreground pixels, a compensation process is performed with reference to the result of a compensation process that has already been performed. For example, a compensating process is performed with use of the result of a process of compensating for a pixel adjacent to the left or upper side of a pixel to be compensated for or the average of the respective values of such pixels.

The binary-image generation section 34 generates a binary image of each index (i.e., a foreground layer of 1 bit×n pixels (where n is an integer of not less than 2)) with use of the foreground layer inputted from the background layer generation section 33 and the coordinates table generated by the foreground indexing process section 32, and then outputs the binary image to the compression section 35.

The compression section 35 compresses the foreground and background layers according to methods suitable for the respective characteristics of the layers, and then stores the layers in storage means (not shown) such as a hard disk. Alternatively, the compression section 35 transmits the compressed images to another device capable of communicating via the communication device 5. Further, in accordance with an instruction from the main control section, the compression section 35 reads out and decompresses the compressed images stored in the storage means, and then outputs the decompressed image data to the segmentation process section 16. Further, the compression section 35 stores, in a foreground-binary-image storage section M1 (see FIG. 1) composed of storage means such as a hard disk and a DRAM, the binary image inputted from the binary-image generation section 34.

In the present embodiment, the compression section 35 compresses a foreground image with use of a reversible compression technique such as JBIG (Joint Bilevel Image Group), MMR (Modified Modified Read Code), or LZW (Lempel Ziv Welch). Meanwhile, the compression section 35 compresses a background image with use of an irreversible compression technique typified by JPEG (Joint Photographic Experts Group). In order to improve the compression rate of a foreground image, it is possible to compress a multiple-bit foreground image by decomposing the multiple-bit foreground image into a binary mask and font color information composed of one or more font colors.

3. Arrangement of the OCR Process Section 15

As shown in FIG. 2, the OCR process section 15 includes the ruled-line extraction section 41, the ruled-line removal section 42, and the character analysis section 43.

Generally, the first step in an OCR process is to perform a process of extracting a rectangular character region (glyph) from image data to be processed. The rectangular character region (glyph) is a region corresponding to each character in the document image. Basically, this glyph extraction process is performed with use of a result of detection of runs (concatenations of pixels each having an output value of 1) of information extending in main scanning and sub-scanning directions of the input image data.

For this reason, in cases where a ruled line (e.g., an underline drawn under a character, a line surrounding a character region, or a ruled line of a table) exists as a run image across a plurality of character regions, the glyph extraction process detects all the character regions as a single glyph, i.e., as a single character, thus badly decreasing the precision of a process of conversion into character information.

The present embodiment avoids such a problem by causing the ruled-line extraction section 41 to extract a ruled-line image from the foreground-layer binary image as generated by the binary-image generation section 34, by causing the ruled-line removal section 42 to remove the ruler-line image from the binary image, and by causing the character analysis section 43 to perform character recognition (OCR process) in accordance with the binary image from which the ruled-line image has been removed. It should be noted that the character analysis section 43 stores a result of the character recognition process (OCR process) in storage means (not shown) in association with the compressed image data of the input image data. The character recognition result thus stored in the storage means is read out appropriately by the main control section, for example, so as to be used for searching.

Figure 1:
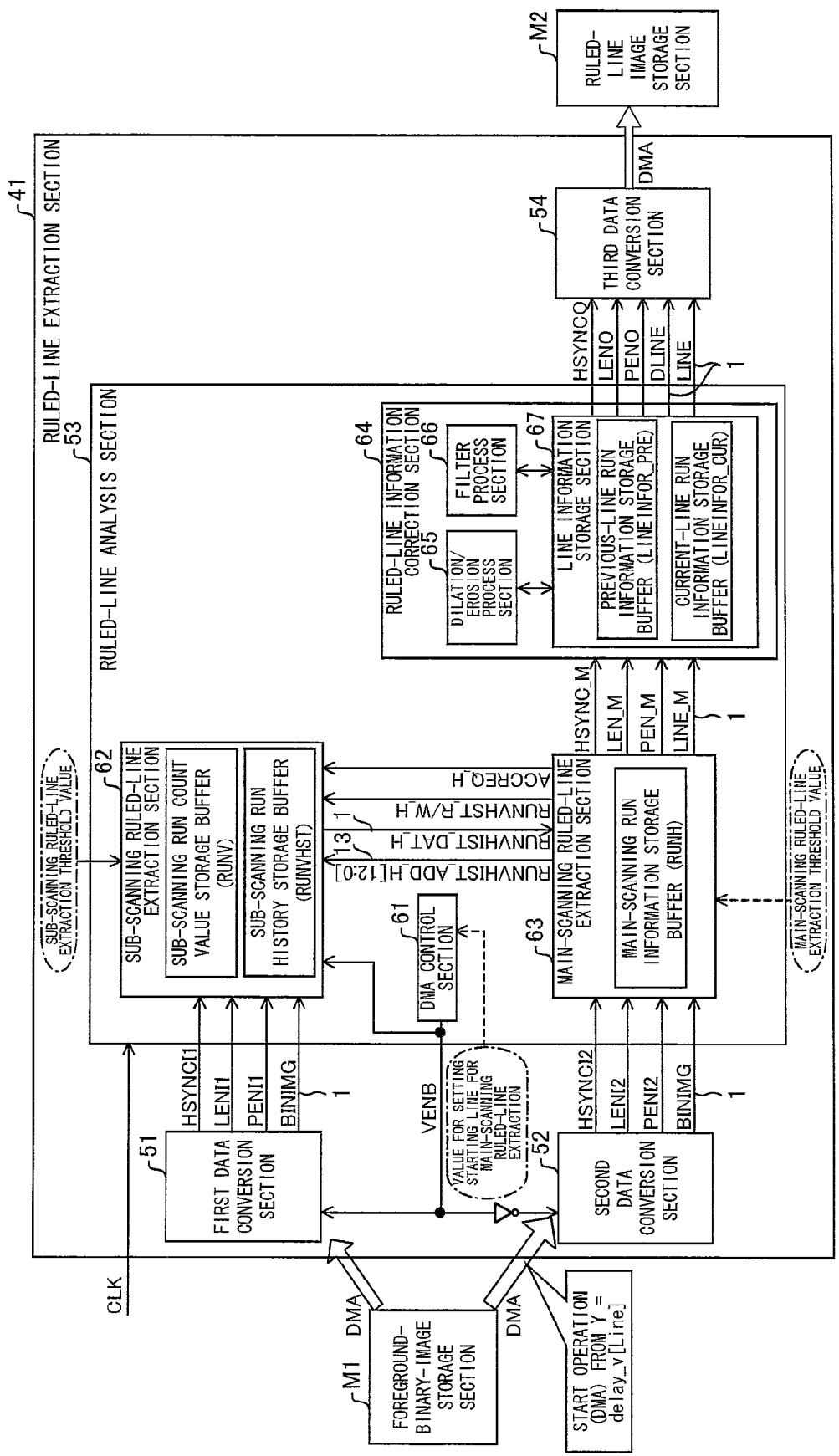
FIG. 1 is a block diagram showing an arrangement of a ruled-line extraction section provided in an image processing apparatus (image reading apparatus, image data output processing apparatus) according to an embodiment of the present invention.

FIG. 1 is a block diagram schematically showing an arrangement of the ruled-line extraction section 41. As shown in FIG. 1, the ruled-line extraction section 41 includes a first data conversion section 51, a second data conversion section 52, a ruled-line analysis section 53, and a third data conversion section 54. Further, the ruled-line analysis section 53 includes a DMA control section 61, a sub-scanning ruled-line extraction section 62, a main-scanning ruled-line extraction section 63, and a ruled-line information correction section 64.

(3-1. First Data Conversion Section 51, Second Data Conversion Section 52, and DMA Control Section 61)

The first data conversion section (DMA-to-VIDEO conversion section) 51 includes a DMA interface and a VIDEO interface. The first data conversion section 51 uses the DMA interface to read out, at a timing corresponding to VENB (control signal) inputted from the DMA control section 61, a foreground-layer binary image (hereinafter referred to as "BINIMG") stored in the foreground-binary-image storage section (external memory) M1, generates image data for a single line, and then outputs the image data via the VIDEO interface to the sub-scanning ruled-line extraction section 62 provided in the ruled-line analysis section 53.

Figure 4:
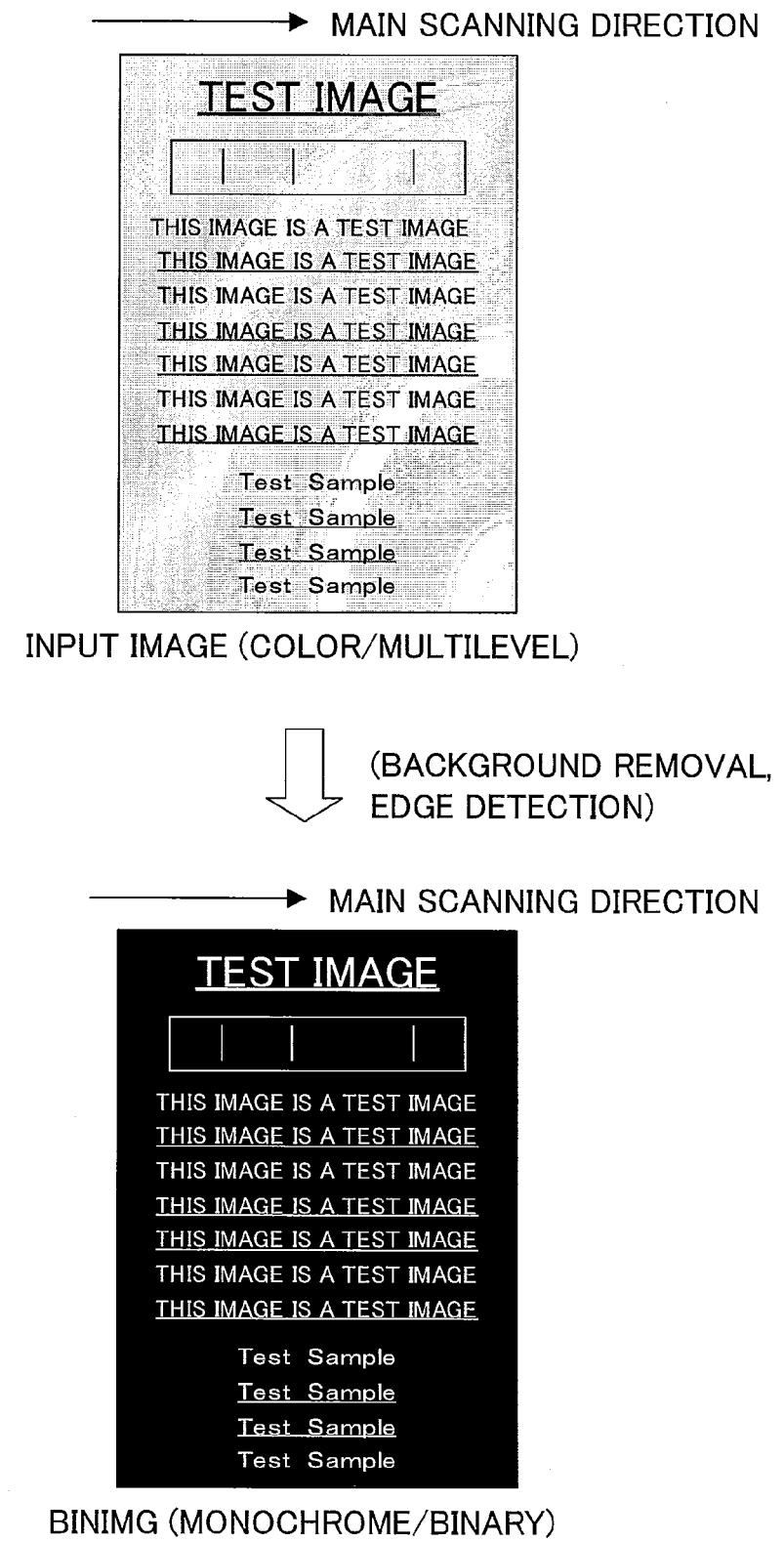
FIG. 4 is an explanatory diagram showing (i) an example of input image data that is inputted to the compression process section shown in FIG. 3 and (ii) a result of processing of the input image data by the compression process section.

FIG. 4 is an explanatory diagram showing an overview of the BINIMG. The BINIMG is a monochrome/1-bit (binary) image where an edge region and a region other than the edge region are represented by 0 and 1 (or 1 and 0) in units of pixel. The edge region is extracted by performing a background removal process and an edge-region detection process on color (multicolor)/multiple-bit input image data.

As with the first data conversion section 51, the second data conversion section (DMA-to-VIDEO conversion section) 52 uses the DMA interface to read out, at a timing corresponding to the VENB inputted from the DMA control section 61, the BINIMG stored in the foreground-binary-image storage section M1, generates image data for a single line, and then outputs the image data via the VIDEO interface to the main-scanning ruled-line extraction section 63 provided in the ruled-line analysis section 53.

The present embodiment describes a case where the size of the foreground-layer binary image (BINIMG) stored in the foreground binary image storage section M1 is such that the number of pixels in the main scanning direction is not more than 8,192 and the number of pixels in the sub-scanning direction is not more than 65,536. However, the numbers of pixels in the main scanning and sub-scanning directions (size) are not so limited. In order to change the size of an image to be processed, it is only necessary to set the bit width of a register or bus in the ruled-line extraction section 41 to a width corresponding to the size.

Figure 5:
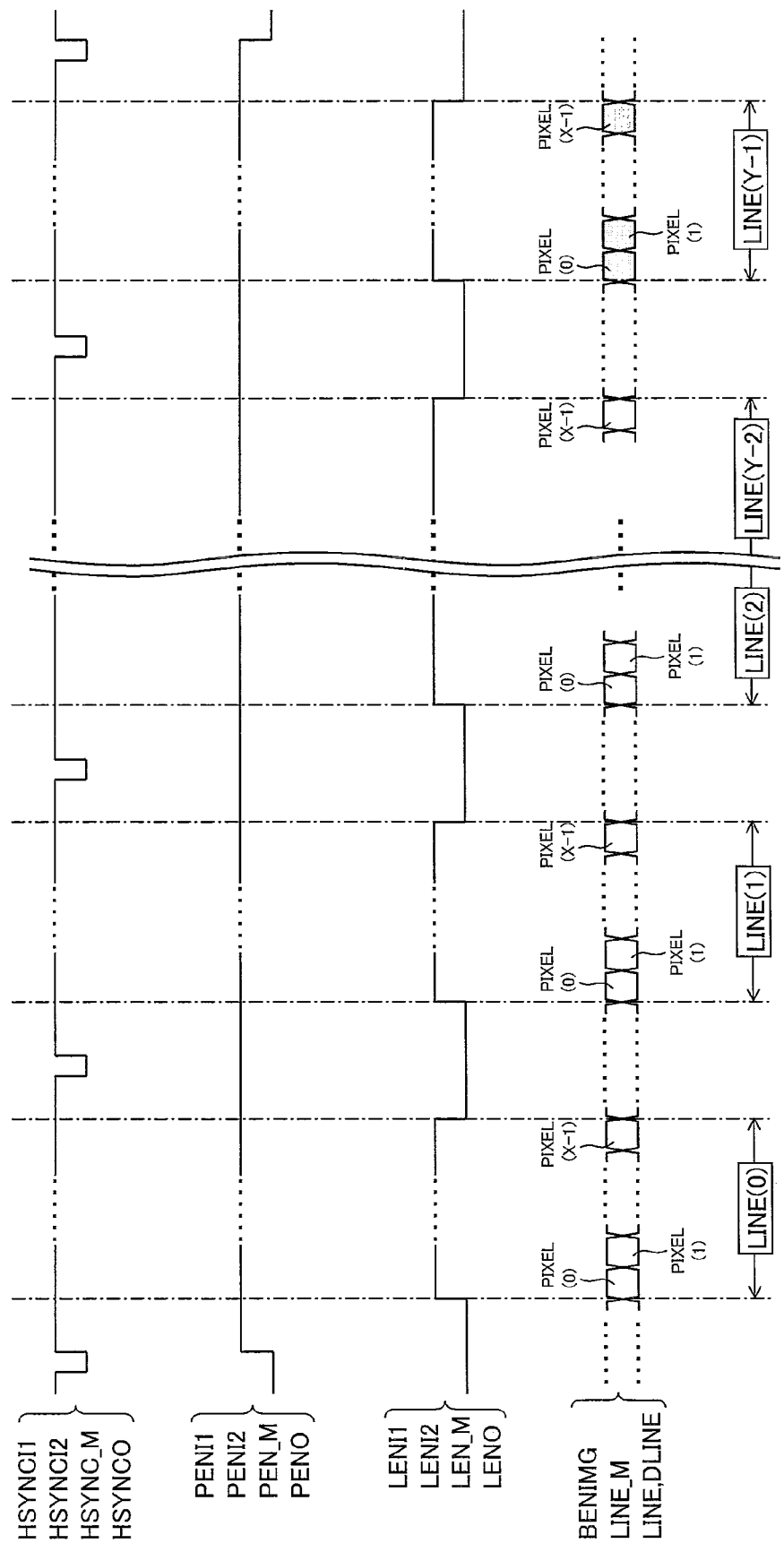
FIG. 5 is a signal waveform diagram of signals that are processed in the ruled-line extraction section shown in FIG. 1.

FIG. 5 is an explanatory diagram showing the respective signal waveforms of signals that are sent from the first data conversion section 51 to the sub-scanning ruled-line extraction section 62, from the second data conversion section 52 to the main-scanning ruled-line extraction section 63, from the main-scanning ruled-line extraction section 63 to the ruled-line information correction section 64, and from the ruled-line information correction section 64 to the third data conversion section 54.

Sent from the first data conversion section 51 to the sub-scanning ruled-line extraction section 62 via the VIDEO interface as shown in FIG. 1 are the following signals (a) to (d):

(a) HSYNCI1 (horizontal synchronizing signal; signal for starting each line (inclusive of an invalid interval at the head of each line);

(b) LENI1 (line-enabling signal; image transfer is enabled when this signal is H (=1) and image transfer is disabled when this signal is L (=0). This signal rises or falls in synchronization with a rising edge of the HSYNCI1 signal);

(c) PENI1 (pixel-enabling signal; BINIMG is outputted from the first data conversion section 51 to the sub-scanning ruled-line extraction section 62 during a period in which this signal is H (=1). A timing at which the pixel-enabling signal starts to rise and a period of time during which the pixel-enabling signal is H are determined by the setting for a register (not shown)); and (d) BINIMG (binary image data described above).

It should be noted that each of the signals that are outputted from the first data conversion section 51 is synchronized with a reference clock signal CLK that is inputted from the main control section to the ruled-line extraction section 41. (Since the HSYNCI1 signal is in synchronization with the CLK signal, the LENI1 signal is synchronized with the CLK signal, too, although the LENI1 signal is in synchronization with a rising edge of the HSYNCI1 signal.)

Therefore, as shown in FIG. 5, in a period of time during which the LENI1 signal is H and the PENI1 signal is H, pixels of each line of the BINIMG signal read out from the foreground-binary-image storage section M1 and converted into line data are inputted in sequence to the sub-scanning ruled-line extraction section 62, starting from the first pixel of each line, i.e., from the leftmost pixel of each line image. For this reason, the number of CLK signals inputted to the ruled-line extraction section 41 during the period in which the PENI1 signal is H is the main-scanning size of the BINIMG (number of pixels in the main scanning direction), and the number of rising edges of the HSYNCI1 signal outputted from the first data conversion section 51 during the period in which the LENI1 signal is H is the sub-scanning size of the BINIMG (number of pixels in the sub-scanning direction).

Sent from the second data conversion section 52 to the main-scanning ruled-line extraction section 63 via the VIDEO interface as shown in FIG. 1 are the following signals (a') to (d'):

(a') HSYNCI2 (horizontal synchronizing signal; signal for starting each line (inclusive of an invalid interval at the head of each line);

(b') LENI2 (line-enabling signal; image transfer is enabled when this signal is H (=1) and image transfer is disabled when this signal is L (=0). This signal rises or falls in synchronization with a rising edge of the HSYNCI2 signal);

(c') PENI2 (pixel-enabling signal; BINIMG is outputted from the second data conversion section 52 to the main-scanning ruled-line extraction section 63 during a period in which this signal is H (=1). A timing at which the pixel-enabling signal starts to rise and a period of time during which the pixel-enabling signal is H are determined by the setting for a register (not shown)); and (d') BINIMG (binary image data described above). It should be noted that each of the signals that are outputted from the second data conversion section 52 is synchronized with a reference clock signal CLK that is inputted from the main control section to the ruled-line extraction section 41.

Therefore, as shown in FIG. 5, in a period of time during which the LENI2 signal is H and the PENI2 signal is H, pixels of each line of the BINIMG signal read out from the foreground-binary-image storage section M1 and converted into line data are inputted in sequence to the main-scanning ruled-line extraction section 63, starting from the first pixel of each line, i.e., from the leftmost pixel of each line image. For this reason, the number of CLK signals inputted to the ruled-line extraction section 41 during the period in which the PENI2 signal is H is the main-scanning size of the BINIMG (number of pixels in the main scanning direction), and the number of rising edges of the HSYNCI2 signal outputted from the second data conversion section 52 during the period in which the LENI2 signal is H is the sub-scanning size of the BINIMG (number of pixels in the sub-scanning direction).

Figure 6:
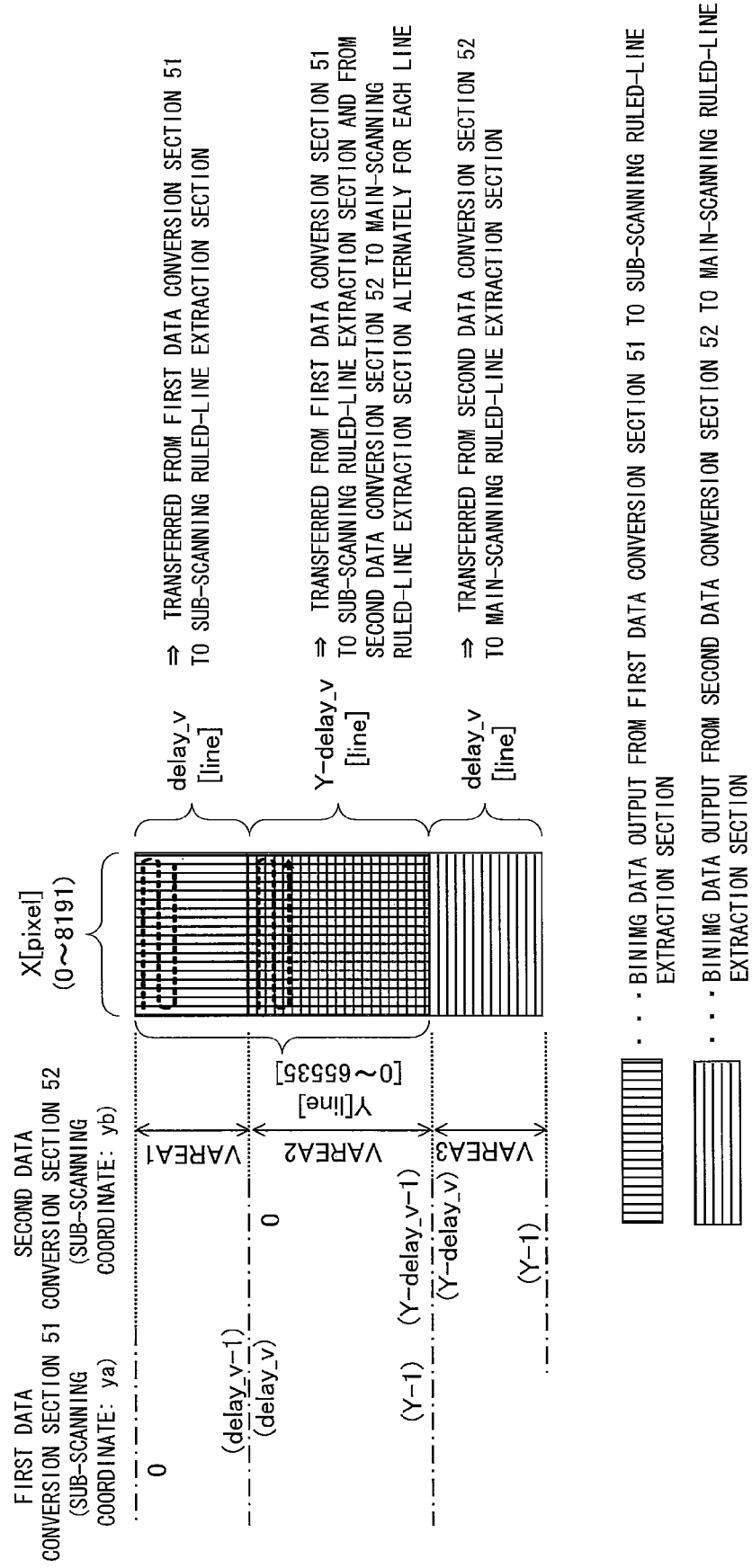
FIG. 6 is an explanatory diagram for explaining processes that are performed in first and second data conversion sections provided in the ruled-line extraction section shown in FIG. 1.

FIG. 6 is an explanatory diagram showing how the first and second data conversion sections 51 and 52 operate in processing a BINIMG having a main-scanning size (number of pixels) of X[pixel] and a sub-scanning size (number of lines) of Y[line].

First, upon receiving, from the main control section, a command to start a ruled-line extraction process, the DMA control section 61 outputs VENB=H (=1) to the first and second data conversion sections 51 and 52. There is an inverter provided between the DMA control section 61 and the second data conversion section 52; therefore, when the DMA control section 61 outputs VENB=H, the second data conversion section 52 receives VENB=L.

Upon receiving VENB=H, the first data conversion section 51 issues (sends) a DMA data obtaining command to the foreground-binary-image storage section M1, and then obtains a BINIMG from the foreground-binary-image storage section M1 via the DMA interface. The BINIMG thus obtained is stored in a line buffer memory (not shown) provided in the first data conversion section 51, starting from the first pixel. In cases where it is impossible to obtain data for 1[line] in a single DMA transfer, it is only necessary to issue another DMA data obtaining command to the foreground-binary-image storage section M1 so as to compensate for the data.

When the BINIMG for 1[line] (line data for ya=0) is thus stored in the line buffer memory of the first data conversion section 51, the line data for the line ya=0 is sent from the first data conversion section 51 to the sub-scanning ruled-line extraction section 62 as shown in FIG. 6.

After that, as shown in FIG. 6, the first data conversion section 51 obtains the BINIMG from the foreground-binary-image storage section M1, generates line data, and outputs data to the sub-scanning ruled-line extraction section 62, in sequence for each line, until the value of ya reaches the set value delay_v of a user-configurable register (during a period VAREA1 shown in FIG. 6). During this period, the DMA control section 61 always outputs VENB=H. Further, during this period, the second data conversion section 52 receives VENB=L and remains in a standby state without issuing a DMA transfer request. It should be noted that the set value delay_v is set by a user or the main control section so as to fall within a range of 0≦delay_v<maximum sub-scanning size (number of lines).

Table 1 shows how the first and second data conversion sections 51 and 52 and the DMA control section 61 operate after the first data conversion section 51 finishes processing line data for ya=(delay_v−1) (after the end of the period VAREA1).

TABLE 1

| First data conversion section 51 (Processing line coordinate: ya) | Second data conversion section 52 (Processing line coordinate: yb) | VENB signal value |
| --- | --- | --- |
| delay_v | (stopped) | H (= 1) |
| (stopped) | 0 | L (= 0) |
| delay_v + 1 | (stopped) | H |
| (stopped) | 1 | L |
| ... | ... | ... |
| Y − 2 | (stopped) | H |
| (stopped) | Y − delay_v − 2 | L |
| Y − 1 (final line) | (stopped) | H |
| (stopped) | Y − delay_v − 1 | L |

As shown in Table 1, the first data conversion section 51 processes line data for ya=(delay_v) after finishing processing the line data for ya=(delay_v−1) (after the end of the period VAREA1). Then, after the first data conversion section 51 finishes processing the line data for ya=(delay_v), the DMA control section 61 switches the control signal VENB to VENB=L(=0). With this, the first data conversion section 51 receives VENB=L, and the second data conversion section 51 receives VENB=H.

Therefore, the first data conversion section 51 comes into a standby state (stopped state) without issuing a DMA transfer request, and the second data conversion section 52 starts to process line data for the line yb=0. That is, the second data conversion section 52 issues (sends) a DMA data obtaining command to the foreground-binary-image storage section M1, and then obtains a BINIMG for the line yb=0 from the foreground-binary-image storage section M1 via the DMA interface. The BINIMG thus obtained is stored in a line buffer memory (not shown) provided in the second data conversion section 52, starting from the first pixel. Further, the second data conversion section 52 outputs, to the main-scanning ruled-line extraction section 63, the line data stored in the line buffer.

After that, the second data conversion section 52 finishes processing the line data for the line yb=0, and then the DMA control section 61 switches the VENB signal again to VENB=H. With this, the second data conversion section 52 comes into a standby state (stopped state), and the first data conversion section 51 processes line data for the line ya=(delay_v+1). Subsequently, until the second data conversion section 52 finishes processing line data for the line yb=(Y−delay_v−1) (during a period VAREA2 shown in FIG. 6), the DMA control section 61 switches VENB in sequence every time the first or second data conversion section 51 or 52 finishes processing line data for a single line. Therefore, the first and second data conversion sections 51 and 52 process line data (line transfer process) alternately for each single line one by one.

After the second data conversion section 52 finishes processing the line data for the line yb=(Y−delay_v−1), the DMA control section 61 causes the control signal VENB to be always L until the second data conversion section 52 finishes processing line data for the line yb=(Y−1). With this, the first data conversion section 51 is held in a standby state, the second data conversion section 52 processes line data in sequence for each line from yb=(Y−delay_V) to yb=(Y−1).

(3-2. Sub-Scanning Ruled-Line Extraction Section 62)

Figure 7:
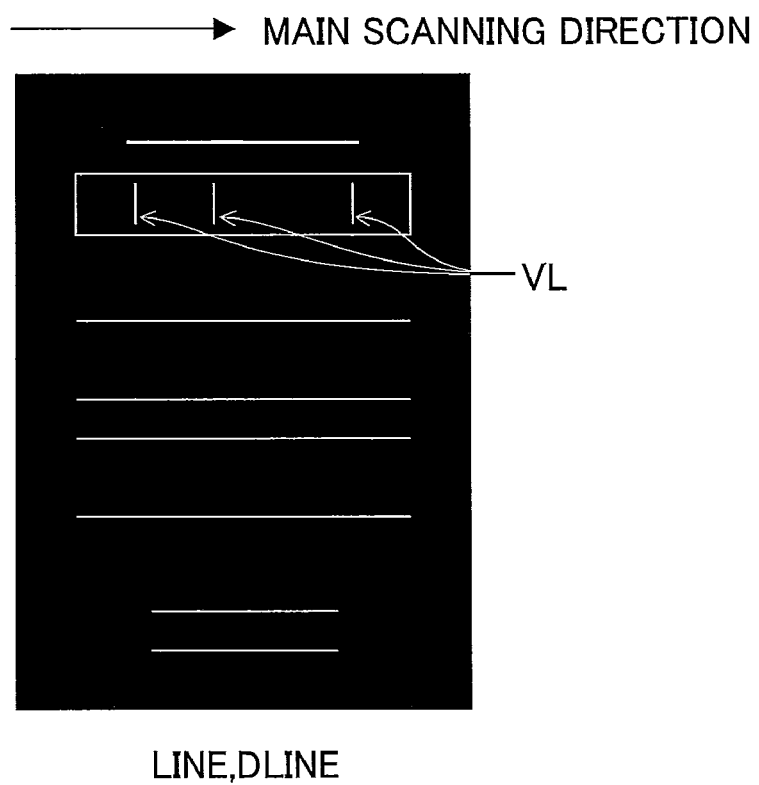
FIG. 7 is an explanatory diagram showing an example of a sub-scanning run image that is detected by a sub-scanning ruled-line extraction section provided in the ruled-line extraction section shown in FIG. 1.

The sub-scanning ruled-line extraction section (second counting section) 62 analyzes signals representing pixels of a BINIMG inputted from the first data conversion section 51, detects the presence or absence of a run extending in the sub-scanning direction, i.e., of a certain or larger number of edge pixels connected one after another in the sub-scanning direction, and then retains information indicating a result of the detection. For example, in cases where the input image data is a binary image shown in FIG. 7, the three vertical lines VL, which exist in the rectangular region of the image, are detected as runs extending in the sub-scanning direction, from among the edge-detected pixels displayed as white images.

Figure 8:
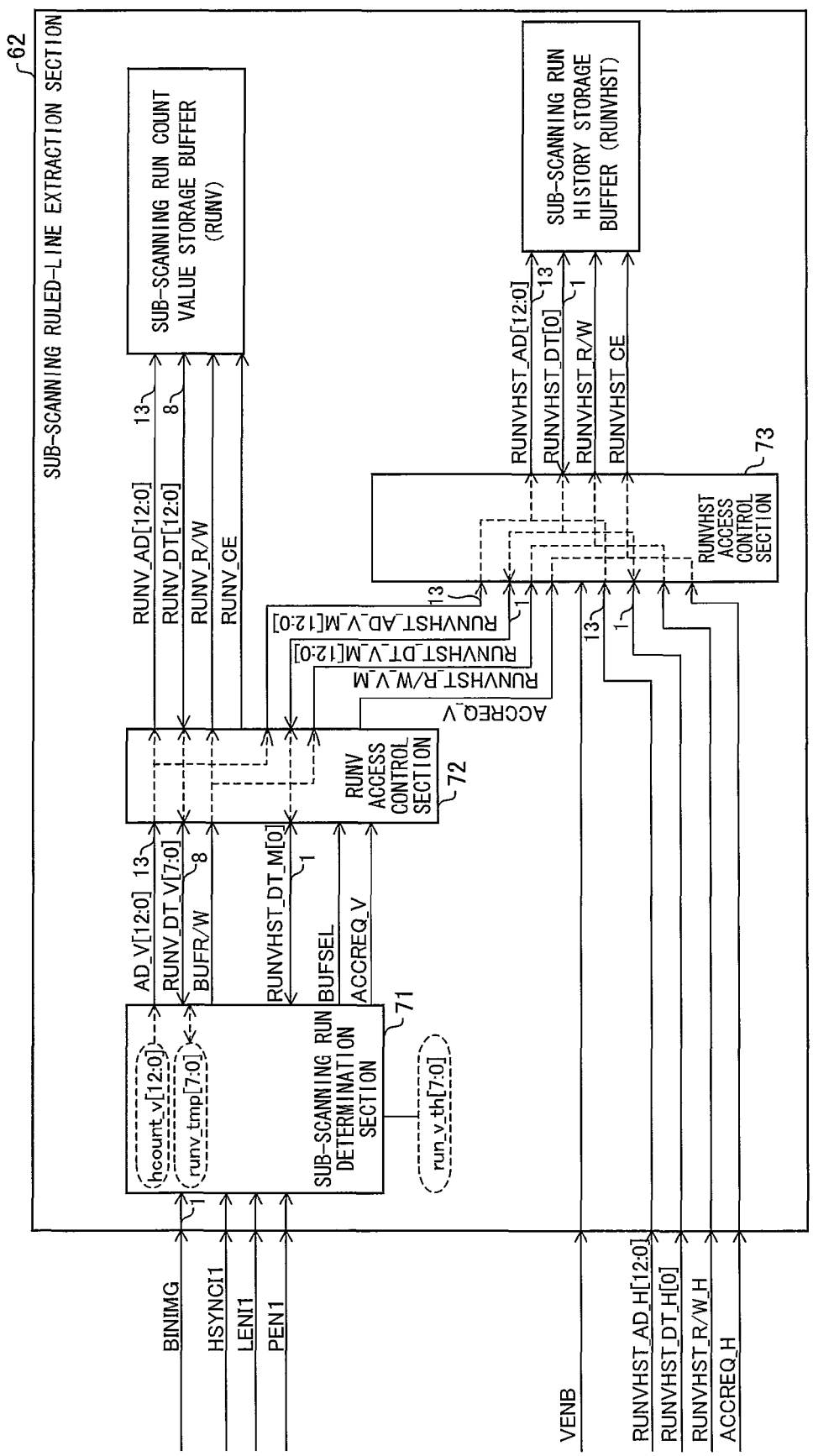
FIG. 8 is a block diagram showing an arrangement of a sub-scanning ruled-line extraction section provided in the ruled-line extraction section shown in FIG. 1.

FIG. 8 is a block diagram showing an arrangement of the sub-scanning ruled-line extraction section 62. As shown in FIG. 8, the sub-scanning ruled-line extraction section 62 includes a sub-scanning run determination section 71, a RUNV access control section 72, a RUNVHST access control section 73, a sub-scanning run count storage buffer (hereinafter referred to as "RUNV"), and a sub-scanning run history storage buffer (hereinafter referred to as "RUNVHST"). It should be noted that the RUNV is configured for 8 bit/Word× 8192 Word and the RUNVHST is configured for 1 bit/Word× 8192 Word. Further, each of the buffers has a memory constituted by a memory element such as a SRAM.

(3-2-1. Sub-Scanning Run Determination Section 71)

The sub-scanning run determination section (second counting section) 71 receives a HSYNCI1 signal (horizontal synchronizing signal), a LENI1 signal (line-enabling signal), a PENI1 signal (pixel-enabling signal), and BINIMG (image data) from the first data conversion section 51. Further, the sub-scanning run determination section 71 has internal registers hcount_v[12:0] and runv_tmp[7:0].

The internal register hcount_v[12:0] indicates a main-scanning pixel address value of BINIMG (line data) inputted thereto. Specifically, the internal register hcount_v[12:0] is cleared (set to 0) every time a line starts to be inputted, i.e., every time the HSYNCI1 rises. Then, after PENI1=1 is established, the internal register hcount_v[12:0] is incremented every time a pixel is inputted. Further, the value of the internal register hcount_v[12:0] is outputted to the RUNV access control section 72 as an access address signal AD_V[12:0]. As will be described later, the RUNV or RUNVHST access control section 72 or 73 accesses, in accordance with the access address signal AD_V[12:0], a RUNV- or RUNVHST-stored value corresponding to the pixel being processed.

The internal register runv_tmp[7:0] is an internal register in which to store Read/Write data for use at the time of access to the stored value and whose value is outputted to the RUNV access control section 72 as an access data signal RUNV_DT_V[7:0]. It should be noted that the RUNV- and RUNVHST-stored values are all cleared to 0 at a point of time where a page process is started (at a point of time where a ruled-line extraction process is started).

The sub-scanning run determination section 71 performs the following process for each pixel during the image input enabling period shown in FIG. 5, i.e., during the period in which PENI1=H (=1).

First, the sub-scanning run determination section 71 reads out, via the RUNV access control section 72 to the internal register runv_tmp[7:0], a RUNV-stored value corresponding to the main-scanning coordinate value hcount_v[12:0] of each pixel. Specifically, the sub-scanning run determination section 71 sets an access address signal AD_V[12:0], a Read/Write instruction signal BUFR/W (BUFR/W=0 here since the process is a readout process; in the case of a writing process, BUFR/W=1), an access selection signal BUFSEL (signal indicating whether the RUNV or the RUNVHST is being accessed; BUFSEL=0 here since the RUNV is being accessed; in the case of access to the RUNVHST, BUFSEL=1), and a memory access trigger signal ACCREQ_V in accordance with a pixel to be processed, and then outputs the signals to the RUNV access control section 72, thereby reading out, via the RUNV access control section 72, the corresponding RUNV-stored value. It should be noted that the arrangement and operation of the RUNV access control section 72 will be described later.

Next, in cases where the BINIMG value of a target pixel is 1, the sub-scanning run determination section 71 increments the value of the internal register runv_tmp[7:0] by 1, and then writes the incremented value RUNV_DT_V[7:0] again into an address=hcount_v[12:0] of the RUNV via the RUNV access control section 72. Specifically, the sub-scanning run determination section 71 outputs the access address signal AD_V[12:0], the Read/Write instruction signal BUFR/W (BUFR/W=1 since the process is a writing process), the access selection signal BUFSEL (BUFSEL=0 since the RUNV is being accessed), an access data signal RUNV_DT_V[7:0], and the memory access trigger signal ACCREQ_V to the RUNV access control section 72, thereby writing the output signals into the address=hcount_v[12:0] of the RUNV via the RUNV access control section 72.

Further, in cases where the BINIMG value of a target value is 0, the sub-scanning run determination section 71 resets the internal register runv_tmp[7:0] (i.e., runv_tmp[7:0]=0), and then writes the reset value RUNV_DT_V[7:0] again into the address=hcount_v[12:0] of the RUNV via the RUNV access control section 72.

Then, if runv_tmp[7:0]≧run_v_th[7:0], the sub-scanning run determination section 71 writes 1 into a RUNVHST address corresponding to hcount_v[12:0]. It should be noted that run_v_th[7:0] is a sub-scanning ruled-line extraction threshold value that is set in advance by a user or the main control section. Specifically, the sub-scanning run determination section 71 outputs the access address signal AD_V[12:0], the Read/Write instruction signal BUFR/W (BUFR/W=1 here since the process is a writing process), the access selection signal BUFSEL (BUFSEL=1 here since the RUNVHST is being accessed), an access data signal RUNVHST_DT_V_M[0], and the memory access trigger signal ACCREQ_V to the RUNV access control section 72, thereby writing the output signals via the RUNV and RUNVHST access control sections 72 and 73 into the RUNVHST address corresponding to hcount_v[12:0]. It should be noted that the arrangements and operation of the RUNV and RUNVHST access control sections 72 and 73 will be described later.

With this, in cases where there are edge-detected pixels connected one after another in the sub-scanning direction at a main-scanning pixel coordinate, a RUNV-stored value corresponding to such a pixel is incremented for each line, and cleared to 0 at a point of time where the concatenation of edge-detected pixels is interrupted. However, in cases where the number of edge-detected pixels joined one after another reaches run_v_th[7:0], a RUNVHST-stored value corresponding to the main-scanning pixel coordinate is set to 1. In cases where the number of edge-detected pixels joined one after another exceeds the maximum RUNV-stored value (=255), 255 is maintained until the concatenation of edge-detected pixels is interrupted.

(3-2-2. RUNV Access Control Section 72)

In response to a buffer access command from the sub-scanning run determination section 71, the RUNV access control section 72 determines whether to issue an access command to the RUNV or the RUNVHST. In the case of access to the RUNV, the RUNV access control section 72 executes Read access or Write access. In the case of access to the RUNVHST, the RUNV access control section 72 transmits access-related information to the RUNVHST access control section 73.

Figure 9:
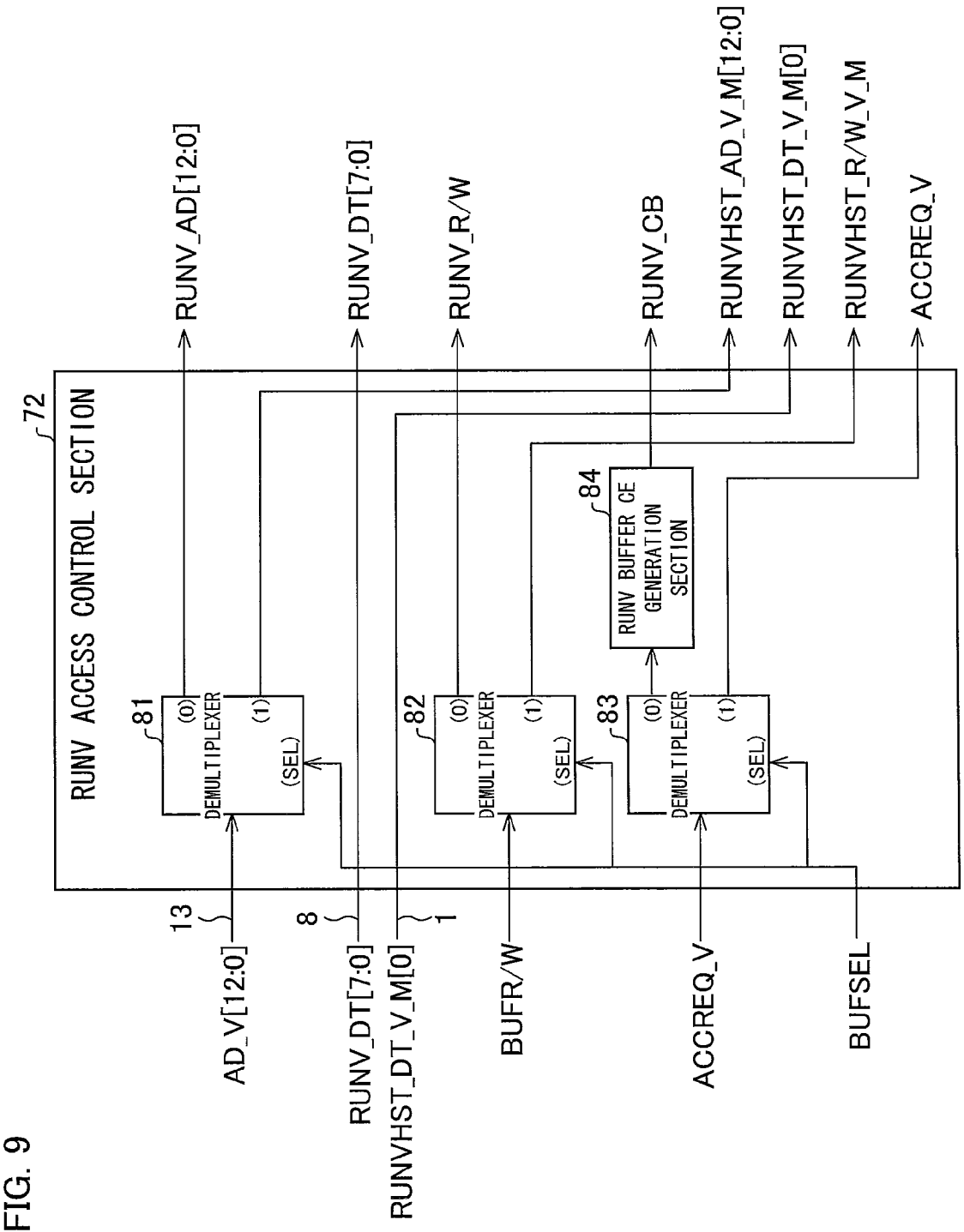
FIG. 9 is a block diagram showing a RUNV access control section provided in the sub-scanning ruled-line extraction section shown in FIG. 8.

FIG. 9 is a block diagram showing an arrangement of the RUNV access control section 72. As shown in FIG. 9, the RUNV access control section 72 includes demultiplexers 81 to 83 and a RUNV buffer CE generation section 84.

The demultiplexer 81 receives the access address signal AD_V[12:0] and the access selection signal BUFSEL from the sub-scanning run determination section 71. Then, in cases where the value of the access selection signal BUFSEL is 0 (in the case of access to the RUNV), the demultiplexer 81 sends an access address signal RUNV_AD[12:0] to the RUNV. On the other hand, in cases where the value of the access selection signal BUFSEL is 1 (in the case of access of the RUNVHST), the demultiplexer 81 sends an access address signal RUNVHST_AD_V_M[12:0] to the RUNVHST.

The demultiplexer 82 receives the Read/Write instruction signal BUFR/W and the access selection signal BUFSEL from the sub-scanning run determination section 71. Then, in cases where the value of the access selection signal BUFSEL is 0 (in the case of access to the RUNV), the demultiplexer 82 sends a Read/Write instruction signal RUNV_R/W to the RUNV. On the other hand, in cases where the value of the access selection signal BUFSEL is 1 (in the case of access of the RUNVHST), the demultiplexer 82 sends a Read/Write instruction signal RUNVHST_R/W_V_M to the RUNVHST.

The demultiplexer 83 receives the memory access trigger signal ACCREQ_V and the access selection signal BUFSEL from the sub-scanning run determination section 71. Then, in cases where the value of the access selection signal BUFSEL is 0 (in the case of access to the RUNV), the demultiplexer 83 sends the memory access trigger signal ACCREQ_V to the RUNV buffer CE generation section 84. On the other hand, in cases where the value of the access selection signal BUFSEL is 1 (in the case of access of the RUNVHST), the demultiplexer 83 sends the memory access trigger signal ACCREQ_V to the RUNVHST.

In the case of writing into the RUNV, the RUNV access control section 72 sends RUNV_DT[7:0] to the RUNV as sent from the sub-scanning run determination section 71. In the case of writing into the RUNVHST, the RUNV access control section 72 sends RUNVHST_DT_V_M[0] to the RUNVHST as sent from the sub-scanning run determination section 71.

Reception of the memory access trigger signal ACCREQ_V from the demultiplexer 83 triggers the RUNV buffer CE generation section 84 to send a chip enable signal RUNV_CE to the RUNV. Thus, the signals RUNV_AD[12:0], RUNV_DT[7:0] (in the case of a Write process), RUNV_R/W, and RUNV_CE are established for the RUNV, and access to a predetermined address in the RUNV is executed.

(3-2-3. RUNVHST Access Control Section 73)

In response to a buffer access command from the sub-scanning run determination section 71, the RUNVHST access control section 73 executes Read access or Write access to the RUNVHST. Further, in response to a buffer access command from the main-scanning ruled-line extraction section 63, the RUNVHST access control section 73 executes Read access or Write access to the RUNVHST.

Figure 10:
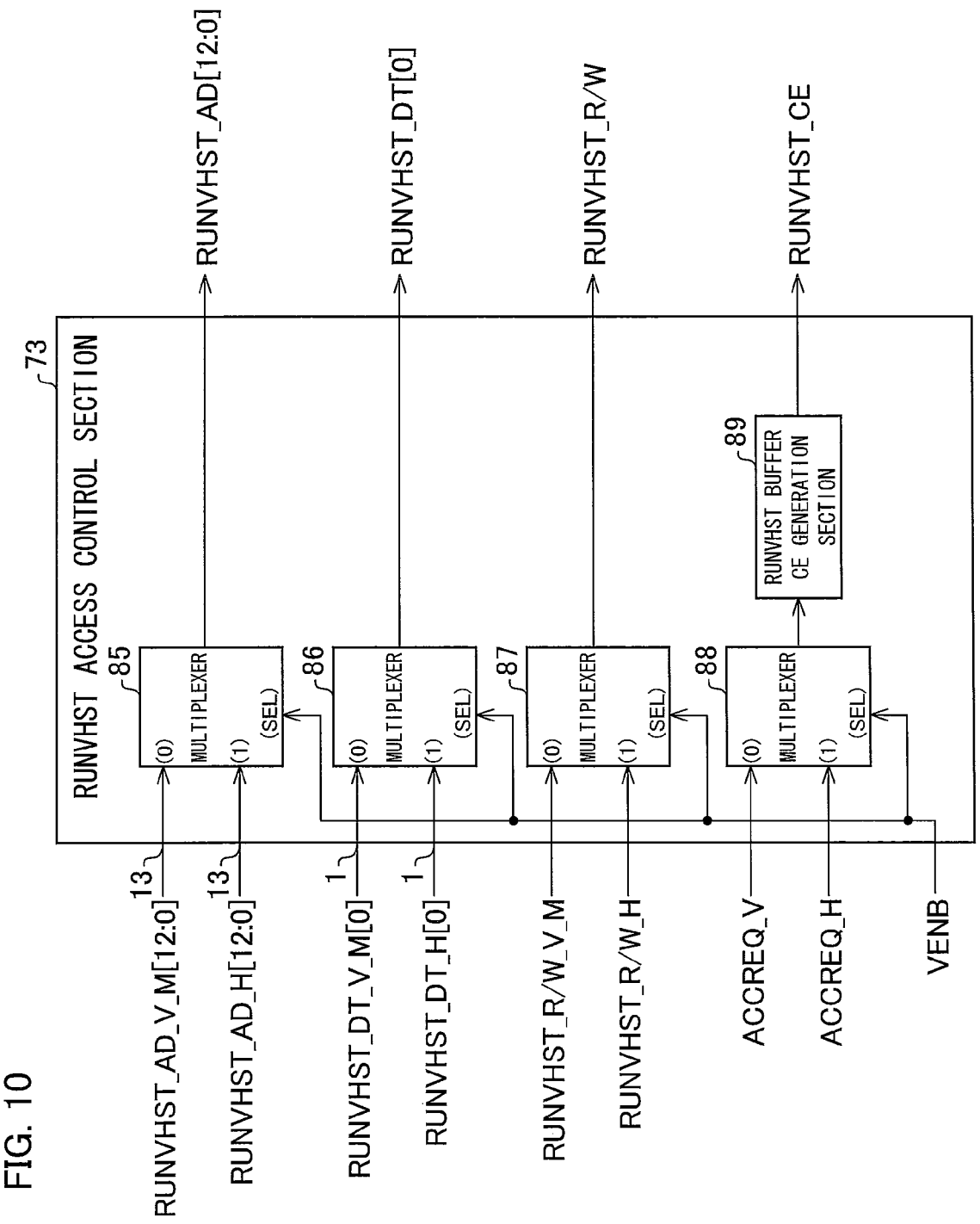
FIG. 10 is a block diagram showing a RUNVHST access control section provided in the sub-scanning ruled-line extraction section shown in FIG. 8.

FIG. 10 is a block diagram showing an arrangement of the RUNVHST access control section 73. As shown in FIG. 10, the RUNVHST access control section 73 includes multiplexers 85 to 88 and a RUNVHST buffer CE generation section 89.

The multiplexer 85 receives the access address signal RUNVHST_AD_V_M[12:0] from the RUNV access control section 72, receives an access address signal RUNVHST_AD_H[12:0] from the main-scanning ruled-line extraction section 63, and also receives the control signal VENB from the DMA control section 61. Then, in cases where VENB=H (during the select period of the first data conversion section 51), the multiplexer 85 sends, as an access address signal RUNVHST_AD[12:0] to the RUNVHST, the access address signal RUNVHST_AD_V_M[12:0] sent from the RUNV access control section 72. Alternatively, in cases where VENB=L (during the select period of the second data conversion section 52), the multiplexer 85 sends, as an access address signal RUNVHST_AD[12:0] to the RUNVHST, the access address signal RUNVHST_AD_H[12:0] sent from the main-scanning ruled-line extraction section 63.

The multiplexer 86 receives the access data signal RUNVHST_DT_V_M[0] from the RUNV access control section 72, receives an access data signal RUNVHST_DT_H[0] from the main-scanning ruled-line extraction section 63, and also receives the control signal VENB from the DMA control section 61. Then, in cases where VENB=H (during the select period of the first data conversion section 51), the multiplexer 86 sends, as an access data signal RUNVHST_DT[0] to the RUNVHST, the access data signal RUNVHST_DT_V_M[0] sent from the RUNV access control section 72. Alternatively, in cases where VENB=L (during the select period of the second data conversion section 52), the multiplexer 86 sends, as an access data signal RUNVHST_DT[0] to the RUNVHST, the access data signal RUNVHST_DT_H[0] sent from the main-scanning ruled-line extraction section 63.

The multiplexer 87 receives the Read/Write instruction signal RUNVHST_R/W_V_M from the RUNV access control section 72, receives a Read/Write instruction signal RUNVHST_R/W_H from the main-scanning ruled-line extraction section 63, and also receives the control signal VENB from the DMA control section 61. Then, in cases where VENB=H (during the select period of the first data conversion section 51), the multiplexer 87 sends, as a Read/Write instruction signal RUNVHST_R/W to the RUNVHST, the Read/Write instruction signal RUNVHST_R/W_V_M sent from the RUNV access control section 72. Alternatively, in cases where VENB=L (during the select period of the second data conversion section 52), the multiplexer 87 sends, as a Read/Write instruction signal RUNVHST_R/W to the RUNVHST, the Read/Write instruction signal RUNVHST_R/W_H sent from the main-scanning ruled-line extraction section 63.

The multiplexer 88 receives the memory access trigger signal ACCREQ_V from the RUNV access control section 72, receives a memory access trigger signal ACCREQ_H from the main-scanning ruled-line extraction section 63, and also receives the control signal VENB from the DMA control section 61. Then, in cases where VENB=H (during the select period of the first data conversion section 51), the multiplexer 88 sends, to the RUNVHST buffer CE generation section 89, the memory access trigger signal ACCREQ_V sent from the RUNV access control section 72. Alternatively, in cases where VENB=L (during the select period of the second data conversion section 52), the multiplexer 88 sends, to the RUNVHST buffer CE generation section 89, the memory access trigger signal ACCREQ_H sent from the main-scanning ruled-line extraction section 63.

Reception of the memory access trigger signal from the multiplexer 88 triggers the RUNVHST buffer CE generation section 89 to send a chip enable signal RUNVHST_CE to the RUNVHST. Thus, the signals RUNVHST_AD[12:0], RUNVHST_DT[0] (in the case of a Write process), RUNVHST_R/W, and RUNVHST_CE are established for the RUNVHST, and access to a predetermined address in the RUNVHST is executed.

Since the control signal VENB switches between H and L in units of processing time for a single line and only one of the sub-scanning ruled-line extraction section 62 and the main-scanning ruled-line extraction section 63 operates during the process (only the sub-scanning ruled-line extraction section 62 operates when VENB=H; only the main-scanning ruled-line extraction section 63 operates when VENB=L), an arrangement is such that there basically occurs no mistake in access to the RUNVHST even when access from the sub-scanning run determination section 71 and access from the main-scanning ruled-line extraction section 63 are performed alternately. Further, the foregoing arrangement is such that should there occur simultaneous access from the sub-scanning run determination section 71 and from the main-scanning ruled-line extraction section 63, no access is accepted from a misbehaving side.

(3-2-4. Example of a Ruled-Line Extraction Process by the Sub-Scanning Ruled-Line Extraction Section 62)

Figure 11:
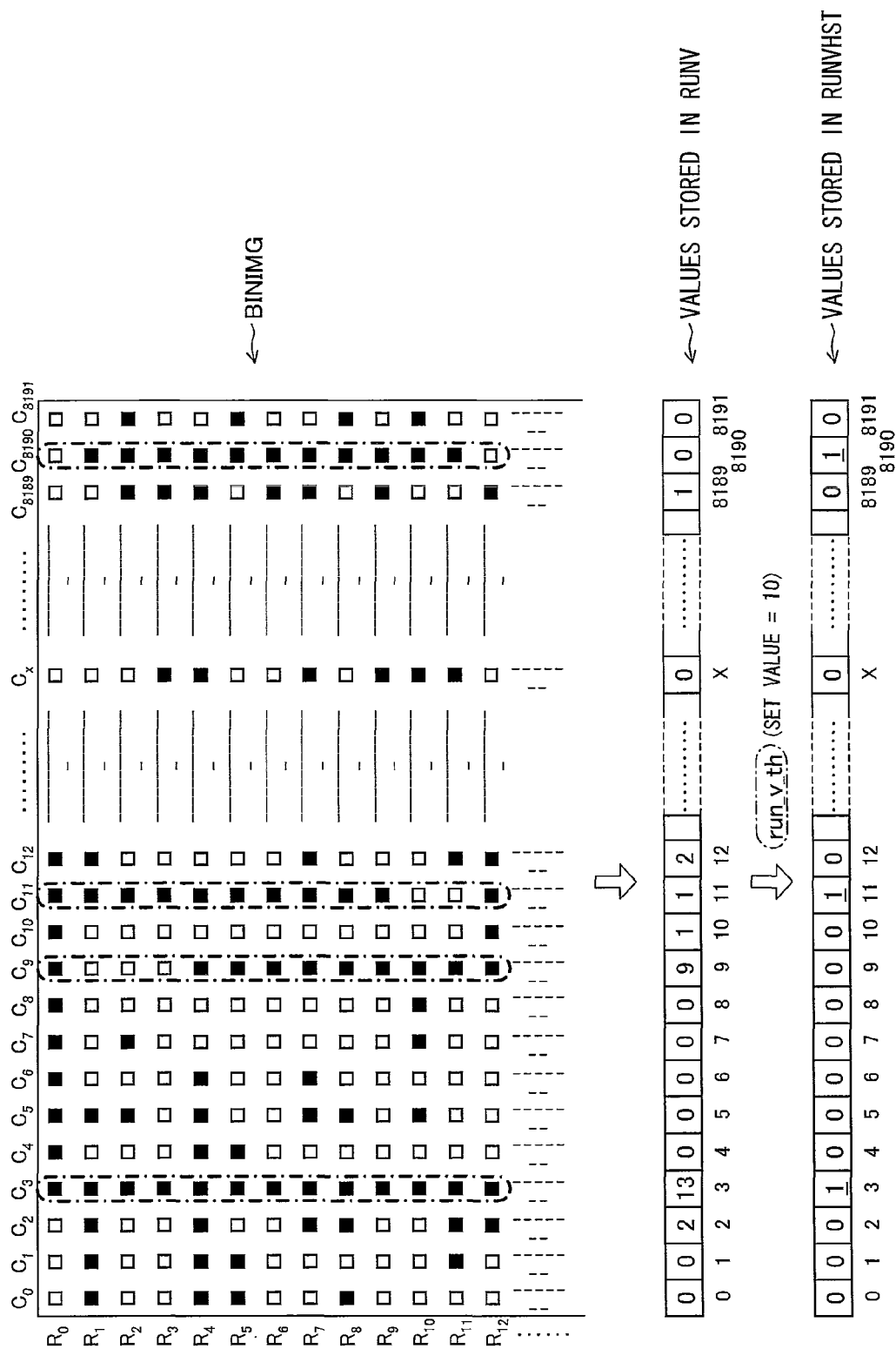
FIG. 11 is an explanatory diagram for explaining a ruled-line extraction process that is performed in the sub-scanning ruled-line extraction section shown in FIG. 8.

FIG. 11 is an explanatory diagram showing an example of a ruled-line extraction process by the sub-scanning ruled-line extraction section 62. The upper column of FIG. 11 indicates BINIMG data to be processed. The middle column of FIG. 11 indicates values stored in the RUNV on completion of processing for the first 13 lines. The lower column of FIG. 11 indicates values stored in the RUNVHST at that time. It should be noted that each of the open squares indicates a non-edge-detected pixel (pixel value=0) and each of the filled squares indicates an edge-detected pixel (pixel value=1).

For convenience of explanation, the content of processing is explained here with attention paid to groups of pixels, each encircled by a dotted line in FIG. 11, which extend in the sub-scanning direction and correspond respectively to main-scanning coordinates (x coordinates) $C_3$, $C_9$, $C_{11}$, and $C_{8190}$. Further, in the following explanation, a data storage address in the RUNV that corresponds to the main-scanning coordinate $C_x$ (where x is an integer of 0 to 8191) is denoted by RUNV(x), and a data storage address in the RUNVHST that corresponds to the main-scanning coordinate $C_x$ is denoted by RUNVHST(x). Further, it is assumed that the set value of the sub-scanning ruled-line extraction threshold value run_v_th[7:0] is 10.

First, the group of pixels that corresponds to the main-scanning coordinate $C_3$ constitutes a concatenation of edge-detected pixels extending from the sub-scanning coordinate (y coordinate) $R_0$ to the sub-scanning coordinate $R_{12}$. For this reason, RUNV(3)=13 upon termination of processing for the line $R_{12}$, and the number of edge-detected pixels connected one after another in the sub-scanning direction (value of RUNV(3)) exceeds 10, which is the set value of run_V_th[7:0], upon termination of processing for the line $R_9$. Therefore, RUNVHST(3)=1 is stored.

Further, as for $C_9$, there is a concatenation of edge-detected pixels extending from $R_4$ to $R_{12}$. Therefore, RUNV(9)=9 upon termination of processing for the 13 lines. However, at this point of time, the number of edge-detected pixels connected one after another has not reached 10, which is the set value of run_v_th[7:0]. Therefore, RUNVHST(9)=0.

Further, as for $C_{11}$, there is a concatenation of edge-detected pixels extending from $R_0$ to $R_9$. Since the number of edge-detected pixels connected one after another reaches 10, which is the set value of run_v_th[7:0], upon termination of $R_9$, RUNVHST(11)=1. However, since the concatenation of edge-detected pixels is interrupted at $R_{10}$, RUNV(11) is cleared at the point of time so that RUNV(11)=0. After that, since there exists another edge-detected pixel at $R_{12}$, RUNV(11)=1 upon termination of the 13 lines.

Further, as for $C_{8190}$, there is a concatenation of edge-detected pixels extending from $R_1$ to $R_{11}$. Since the number of edge-detected pixels connected one after another reaches 10, which is the set value of run_v_th[7:0], upon termination of $R_{11}$, RUNVHST(8190)=1. However, since the concatenation of edge-detected pixels is interrupted at $R_{12}$, RUNV(8190)=0 upon termination of the 13 lines.

In this manner, a main-scanning coordinate at which one or more runs, i.e., regions of concatenation of edge-detected pixels, extending in the sub-scanning direction so as to be larger than the set value of run_v_th[7:0] have been detected has 1 stored in RUNVHST(x) corresponding thereto. In other words, RUNVHST(x) serves for its corresponding main-scanning pixels as a buffer memory in which to store a flag (history) indicating whether or not one or more runs of a size not less than run_v_th[7:0] have been detected.

Thus, the sub-scanning ruled-line extraction section 62 does not extract a ruled-line image extending in the sub-scanning line, but extracts information indicating, for each main-scanning coordinate, whether or not a run of a size not less than a certain size (run_v_th[7:0]) has been detected. It should be noted that an actual ruled-line image extending in the sub-scanning direction is extracted by the after-mentioned main-scanning ruled-line extraction section 63 together with a ruled-line image extending in the main scanning direction.

It should be noted that the value of run_v_th[7:0] only needs to be set by a user in accordance with the size of BINIMG, the resolution of BINIMG, and the like. For example, the value of run_V_th[7:0] may be set in accordance with the extent of a minimum length that a user visually recognizes as a run image extending in the sub-scanning direction, i.e., as a vertical line. For example, in cases where the length of a run that a user can recognize as a vertical line in an image of 600 dpi (600 dots per 1 inch=25.4 mm) is 5 mm, run_v_th[7:0] only needs to be computed as:

$$\text{run\_v\_th}[7:0] = (600 \times 5.0)/25.4 \quad \text{(Formula 1)}$$
$$\approx 118$$
$$= 0 \times 76$$

where the "0x76" denotes a decimal number "118" in hexadecimal form.

(3-3. Main-Scanning Ruled-Line Extraction Section 63)

The main-scanning extraction section (pixel value determination section, counting section, ruled-line image data generation section) 63 analyzes signals representing pixels of a BINIMG inputted from the second data conversion section 52, detects, for each line, image information (image) indicating a run extending in the main scanning direction, i.e., a certain or larger number of edge pixels connected one after another in the main scanning direction, and outputs, to the ruled-line information correction section 64, information indicating a result of the detection.

Further, the main-scanning extraction section 63 refers to information, stored in the sub-scanning run history storage buffer (RUNVHST), which indicates detection of a run extending in the sub-scanning direction, and then reflects the information in the image information (image) indicating edge pixels.

Further, the main-scanning ruled-line extraction section 63 performs image processing for correcting a blur, a break, or the like in a ruled-line portion of input image data (that occurs due to a reading error or the like at the time of image reading).

Figure 12:
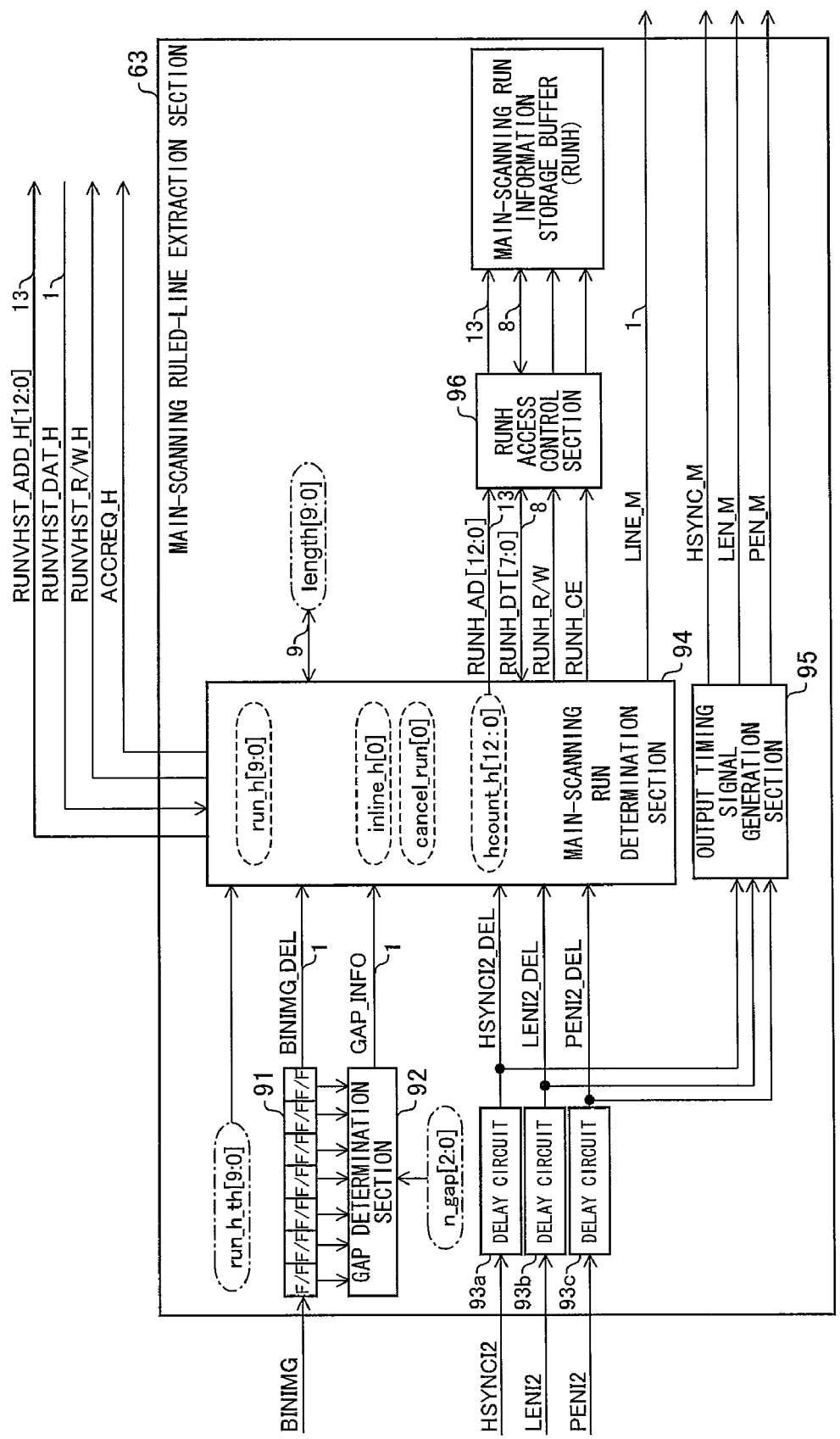
FIG. 12 is a block diagram showing an arrangement of a main-scanning ruled-line extraction section provided in the ruled-line extraction section shown in FIG. 1.

FIG. 12 is a block diagram showing an arrangement of the main-scanning ruled-line extraction section 63. As shown in FIG. 12, the main-scanning ruled-line extraction section 63 includes a flip-flop (F/F) circuit 91, a gap determination section 92, delay circuits 93a to 93c, a main-scanning run determination section 94, an output timing signal generation section 95, a RUNH access control section 96, and a main-scanning run information storage buffer (hereinafter referred to as "RUNH"). It should be noted that the RUNH is composed of a buffer memory of 1 bit/Word×8192 Word that is constituted by a memory element such as a SRAM.

(3-3-1. Flip-Flop Circuit 91)

The flip-flop circuit 91, composed of seven flip-flops, receives a BINIMG from the second data conversion section 52. A pixel's BINIMG inputted to the first flip-flop is sent to the next flip flop in sequence every time a subsequent pixel's BINIMG is inputted, and a BINIMG sent to the seventh flip-flop is outputted to the main-scanning run determination section 94 as BINIMG_DEL. Further, each of the first to sixth flip-flops outputs, to the next flip-flop and the gap determination section 92, a BINIMG inputted thereto.

Therefore, at a point of time where the main-scanning run determination section 94 receives a pixel's BINIMG_DEL, the flip-flop circuit 91 receives data for the seventh pixel as counted from that pixel. Further, at this point of time, the gap determination section 92 receives, from the first to sixth flip-flops, BINIMGs of sixth to first pixels as counted from the pixel whose BINIMG is received by the main-scanning run determination section 94, respectively. That is, the gap determination section 92 receives BINIMGs of pixels, starting from a pixel that comes immediately after the pixel whose BINIMG is received by the main-scanning run determination section 94 to the sixth pixel as counted from that pixel.

(3-3-2. Gap Determination Section 92)

The gap determination section 92 determines, in accordance with six pixels' worth of BINIMG sent from the flip-flop circuit 91, whether or not the six pixels are all non-edgedetected pixels, and then sends, to the main-scanning run determination section 94, a signal GAP_INFO indicating a result of the determination. That is, the gap determination section 92 determines whether the target pixel is followed by a gap in a ruled line (blur in a main-scanning run) and the run per se continues, or determines whether the target pixel is followed by a break in a run (end of a main-scanning run). Therefore, the main-scanning run determination section 94 receives the target pixel's BINIMG_DEL and GAP_INFO indicating a result of detection as to whether the first to sixth pixels as counted from the target pixel are all non-edge-detected pixels.

It should be noted that the gap determination section 92 performs processing as follows:

$$\text{GAP\_INFO} = F1, \text{ when n\_gap [2:0]} = 1; \quad \text{(Formula 2)}$$
$$\text{GAP\_INFO} = F1 | F2, \text{ when n\_gap [2:0]} = 2;$$
$$\text{GAP\_INFO} = F1 | F2 | F3, \text{ when n\_gap [2:0]} = 3;$$
$$\text{GAP\_INFO} = F1 | F2 | F3 | F4, \text{ when n\_gap [2:0]} = 4;$$
$$\text{GAP\_INFO} = F1 | F2 | F3 | F4 | F5,$$
$$\text{when n\_gap [2:0]} = 5;$$
$$\text{GAP\_INFO} = F1 | F2 | F3 | F4 | F5 | F6,$$
$$\text{when n\_gap [2:0]} = 6$$

where F1 to F6 denote BINIMGs of the first to sixth pixels as counted from the target pixel. It should be noted that each of F1 to F6 takes on a value of 1 in the case of an edge-detected pixel, and takes on a value of 0 in the case of a non-edge-detected pixel. Further, n_gap [2:0] is a value that indicates the number of pixels for use in gap determination as counted from the target pixel, and is set by a user optionally within a range of $1 \leq \text{n\_gap [2:0]} \leq 6$.

That is, a value as to the number of confirmation pixels as counted from the target pixel is set as n_gap[2:0] by a user, and if even one of the confirmation pixels is an edge-detected pixel, the gap determination section 92 outputs GAP_INFO=1, even if the other pixels are non-edge-detected pixels. Because of this GAP_INFO, as will be described later, in cases where the confirmation pixels include an edge-detected pixel, a region constituted by the confirmation pixels is judged to be a gap region in a main-scanning run (e.g., a blur having occurred in a main-scanning ruled-line portion at the time of image reading for obtaining input image data), even if there exists a non-edge-detected pixel among the confirmation pixels.

For example, in cases where n_gap[2:0]=5, where each of the first to fourth pixels as counted from a target pixel is a non-edge-detected pixel, and where the fifth pixel as counted from the target pixel is an edge-detected pixel, the gap determination section 92 applies a formula in (Formulae 2) that corresponds to the case where n_gap[2:0]=5, with the result that GAP_INFO=0|0|0|0|1=1. That is, since the fifth one of the confirmation pixels (i.e., the first to fifth pixels as counted from the target pixel) is an edge-detected pixel whereas the first to fourth pixels are non-edge-detected pixels, the non-edge-detected pixels are judged to be a gap zone in a main-scanning run, and the run is judged as continuous.

(3-3-3. Delay Circuits 93a to 93c)

The delay circuits 93a to 93c delay HSYNCI2, LENI2, and PENI2, which have been sent from the second data conversion section 52 to the main-scanning ruled-line extraction section 63, by seven clocks, and then send HSYNCI2, LENI2, and PENI2 to the main-scanning run determination section 94, respectively.

That is, as described above, BINIMG inputted to the flip-flop circuit 91 is delayed by seven clocks and then inputted to the main-scanning run determination section 94. For this reason, the signals HSYNCI2, LENI2, and PENI2, which are inputted from the second data conversion section 52 to the main-scanning ruled-line extraction section 63 in synchronization with BINIMG, need to be inputted to the main-scanning run determination section 94 at the same timing as the BINIMG_DEL signal. In view of this, the delay circuits 93a to 93c delay HSYNCI2, LENI2, and PENI2 by seven clocks, and then send HSYNCI2, LENI2, and PENI2 to the main-scanning run determination section 94, respectively.

The delay circuits 93a to 93c are not particularly limited in circuit arrangement, and as such, may be arranged, for example, in the same manner as the flip-flop circuit 91.

Although the foregoing description assumes that a region for determining a gap zone (number of confirmation pixels) ranges from the first to at most sixth pixels as counted from a target pixel, the present invention is not limited to this. It is possible to configure hardware so as to be able to set a longer zone. Further, in that case, the period of time (delay number; F/F number) by which the VIDEO interface signals HSYNCI2, LENI2, and PENI2 are delayed by the delay circuits 93a to 93c only needs to be changed in accordance with the maximum number of pixels of a region for determining a gap zone (number of confirmation pixels).

(3-3-4. Main-Scanning Run Determination Section 94)

As shown in FIG. 12, the main-scanning run determination section (pixel value determination section, counting section, ruled-line image data generation section) 94 includes internal registers hcount_h[12:0], run_h[9:0], inline_h[0], and cancel_run[0] (for use in internal processing of the main-scanning run determination section 94). Further, the main-scanning run determination section 94 includes user-configurable registers run_h_th[9:0] and length[9:0] (whose parameters are set externally).

The internal register hcount_h[12:0] indicates a main-scanning pixel address value of BINIMG_DEL (line data) inputted from the flip-flop circuit 91. Specifically, the internal register hcount_h[12:0] is cleared (set to 0) every time a line starts to be inputted, i.e., every time the HSYNCI2 rises. Then, after PENI1=1 is established, the internal register hcount_h[12:0] is incremented every time a pixel is inputted. Further, an access address signal RUNH_AD[12:0] corresponding to the value of the internal register hcount_h[12:0] is outputted to the RUNH access control section 96, and the RUNH access control section 96 accesses, in accordance with the access address signal RUNH_AD[12:0], a RUNH-stored value corresponding to the pixel being processed (target pixel). It should be noted that the RUNH is all cleared to 0 at a point of time where a page process is started.

The internal register run_h[9:0] is an internal register in which to store Read/Write data for use at the time of access to the stored value, i.e., in which to store the size of a run extending (i.e., the number of edge-detected pixels connected one after another) in the main scanning direction. However, as will be described later, the number may indicate the number of edge-detected pixels connected one after another so as to straddle one or more gap regions in a run region.

The internal register inline_h[0] is a flag register that indicates that the target pixel is within a main-scanning run region, and the internal register cancel_run[0] is a flag register that indicates that the target pixel is outside of a main-scanning run region. Processes for setting the internal registers inline_h[0] and cancel_run[0] will be detailed later.

The user-configurable register run_h_th[9:0] contains a determination threshold value for determining a main-scanning run with respect to the internal register run_h[9:0]. Further, the user-configurable register length[9:0] contains parameters for use in a filling process for the RUNH that is performed when the threshold values of the registers run_h_th[9:0] and run_h[9:0] are determined (main-scanning run determination). Processes for setting the user-configurable registers run_h_th[9:0] and length[9:0] will be detailed later.

Figure 13:
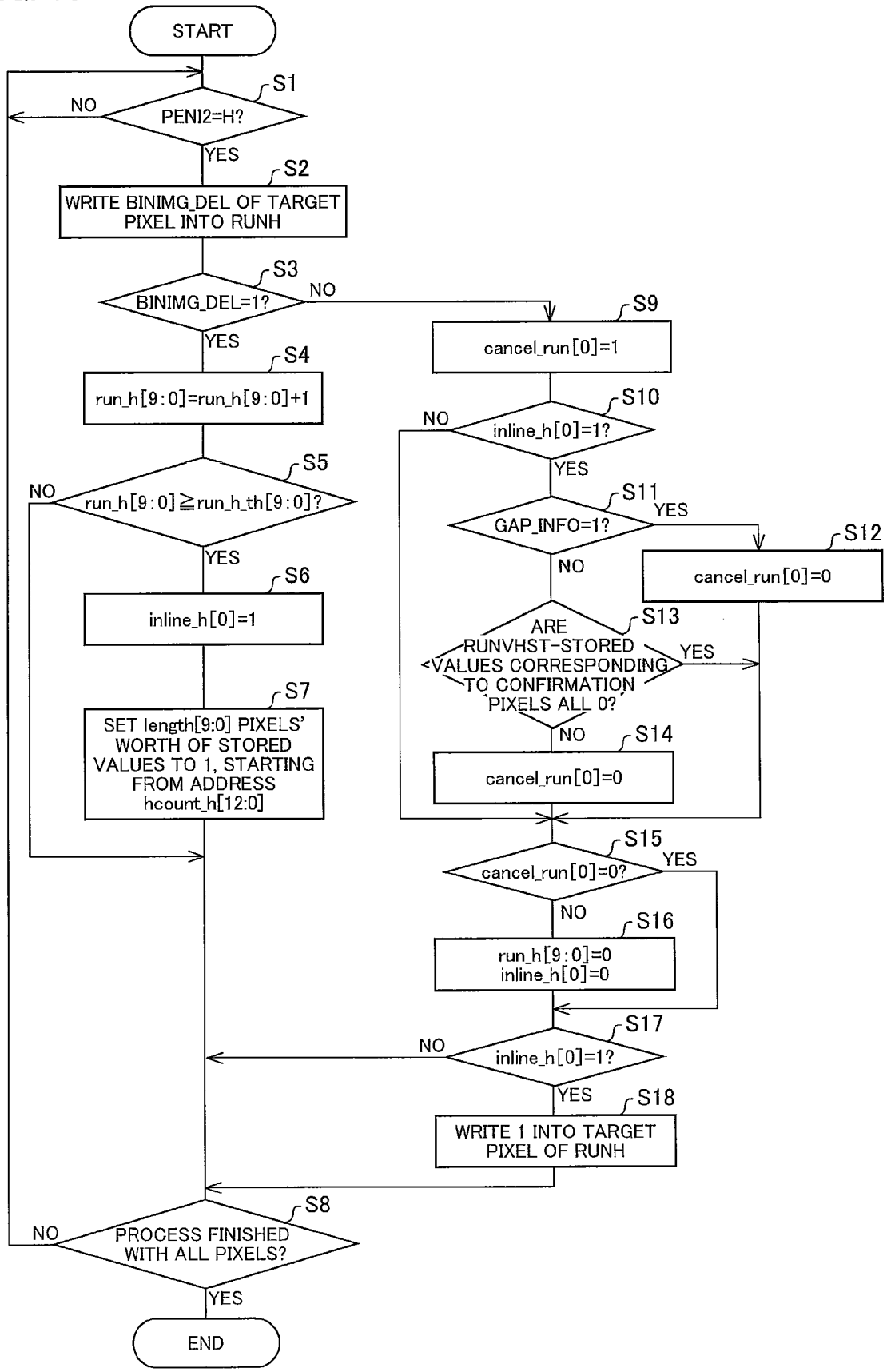
FIG. 13 is a flow chart showing the flow of a process that is performed in the main-scanning ruled-line extraction section shown in FIG. 12.

FIG. 13 is a flow chart showing the flow of a process that is performed by the main-scanning run determination section 94. As shown in FIG. 13, the main-scanning run determination section 94 determines whether or not it is a period in which image input is enabled, i.e., whether or not it is a period in which PENI2=H(=1) (Step S1). Then, in cases where the main-scanning run determination section 94 determines that it is a period in which image input is enabled, the main-scanning run determination section 94 performs Step 2 and the subsequent steps for each pixel.

First, the main-scanning run determination section 94 writes the signal value of BINIMG_DEL via the RUNH access control section 96 into a RUNH address corresponding to the main-scanning coordinate value hcount_h[12:0] of each pixel (Step S2). Specifically, by setting the access address signal RUNH_AD[12:0], a Read/Write instruction signal RUNH_R/W, and the memory access trigger signal ACCREQ_H in accordance with the pixel to be processed and outputting the output signals to the RUNH access control section 96, the main-scanning run determination section 94 writes the signal value of BINIMG_DEL into the corresponding RUNH address.

Next, the main-scanning run determination section 94 determines whether or not the value of BINIMG_DEL of the target pixel is 1 (whether or not the target pixel is an edge-detected pixel) (Step 3). Then, in cases where BIN-IMG_DEL=1 (in cases where the target pixel is an edge-detected pixel), the main-scanning run determination section 94 increments the value of run_h[9:0] by 1 (Step S4). However, in cases where the stored value of run_h[9:0] is already a maximum value (=1023), the main-scanning run determination section 94 keeps the maximum value of run_h[9:0]. Then, the main-scanning run determination section 94 makes a comparison between run_h[9:0] and run_h_th[9:0] (Step S5).

In cases where the main-scanning run determination section 94 determines, as a result of the comparison, that run_h [9:0]≧run_h_th[9:0], the main-scanning run determination section 94 sets inline_h[0] so that inline_h[0]=1 (Step S6). As well, the main-scanning run determination section 94 unconditionally sets (fills), to "1" (edge-detected pixel), stored data for the length[9:0] address (i.e., for a pixel corresponding to the value of length[9:0]) toward the head of the RUNH (toward the address corresponding to a pixel on the left of the target pixel), starting from the RUNH address hcount_h[12:0] (Step S7). After that, the main-scanning run determination section 94 determines whether or not all the pixels have been finished with the main-scanning run determination process (Step S8). If no, the main-scanning run determination section 94 performs Step 1 and the subsequent steps on the next pixel. If yes, the main-scanning run determination section 94 finishes the process.

On the other hand, in cases where the main-scanning run determination section 94 determines, as a result of the comparison, that run_h[9:0]<run_h_th[9:0], the main-scanning run determination section 94 proceeds to Step S8 without changing the set value of inline_h[0] or the RUNH-stored value.

Further, in cases where the main-scanning run determination section 94 determines in Step S3 that the value of BIN-IMG_DEL of the target pixel is 0 (in cases where the target pixel is a non-edge-detected pixel), the main-scanning run determination section 94 first sets cancel_run[0] so that cancel_run[0]=1 (Step S9).

Next, the main-scanning run determination section 94 determines whether or not inline_h[0]=1 (whether or not the pixel on the left of the target pixel is within a main-scanning run region) (Step S14). Then, in cases where the main-scanning run determination section 94 determines that inline_h[]≠ 1 (that the pixel on the left of the target pixel is outside of a main-scanning run region), the main-scanning run determination section 94 proceeds to Step S15, which is to be mentioned later.

On the other hand, in cases where the main-scanning run determination section 94 determines that inline_h[0]=1 (that the pixel on the left of the target pixel is within a main-scanning run region), the main-scanning run determination section 94 determines whether or not GAP_INFO=1 (whether or not the first to sixth pixels as counted upstream from the target pixel in the main scanning direction include an edge-detected pixel) (Step S11). Then, in cases where GAP_INFO=1 (in cases where the first to sixth pixels as counted upstream from the target pixel in the main scanning direction include an edge-detected pixel), the main-scanning run determination section 94 sets cancel_run[0] so that cancel_run[0]= 0 (Step S12), and then proceeds to Step S15, which is to be mentioned later.

On the other hand, in cases where GAP_INFO=0 (in cases where the first to sixth pixels as counted upstream from the target pixel in the main scanning direction include no edge-detected pixel), the main-scanning run determination section 94 reads out, from the RUNVHST provided in the sub-scanning ruled-line extraction section 62, stored values corresponding to pixels of a gap observation region (confirmation pixels), i.e., corresponding to pixels from hcount_h[12:0]+1 to hcount_h[12:0]+n_gap[2:0], and then determines whether or not there is a pixel whose stored value is 1 (Step S13). Specifically, the main-scanning run determination section 94 outputs, to the sub-scanning ruled-line extraction section 62, RUNVHST_AD_H[12:0], RUNVHST_DT_H[0], RUNVH-ST_R/W_H, and ACCREQ_H corresponding to pixels from hcount_h[12:0]+1 to hcount_h[12:0]+n_gap[2:0], and then obtains the respective stored values of the pixels.

Then, in cases where even one of the pixels of the gap observation region is a pixel whose stored value is 1, the main-scanning run determination section 94 sets cancel_run [0] so that cancel_run[0]=0 (Step S14), and then proceeds to Step S15, which is to be mentioned later. On the other hand, in cases where every one of the pixels of the gap observation region has a value of 0 stored in the RUNVHST, the main-scanning run determination section 94 proceeds to Step S15, which is to be mentioned later, without changing the set value of cancel_run[0]. Therefore, in this case, cancel_run[0]=1.

In Step S15, the main-scanning run determination section 94 determines whether or not cancel_run[0]=0 (Step S15). Then, in cases where cancel_run[0]=0, the main-scanning run determination section 94 proceeds to Step S17, which is to be mentioned later, without changing the values of run_h[9:0] and inline_h[0]. On the other hand, in cases where the main-scanning run determination section 94 determines that cancel_run[0]=1, the main-scanning run determination section 94 sets (resets) the values of run_h[9:0] and inline_h[0] to 0 (Step S16), and then proceeds to Step S17.

Next, the main-scanning run determination section 94 determines whether or not inline_h[0]=1 (Step S17). Then, in cases where the main-scanning run determination section 94 determines that inline_h[0]=1, the main-scanning run determination section 94 writes (overwrites) 1 into the RUNH address hcount_h[12:0] (Step S18), and then proceeds to Step S18. As a result of this process, every gap portion in the main-scanning run region is filled with 1. On the other hand, in cases where the main-scanning run determination section 94 determines that inline_h[0]=0, the main-scanning run determination section 94 proceeds to Step S8 without changing the RUNH-stored value.

As a result of the foregoing process, image data of a run image (ruled-line image) for a single line is stored in the RUNH. On completion of run image data LINE_M for a single line in the RUNH, the main-scanning run determination section 94 outputs the run image data LINE_M to the ruled-line information correction section 64 via the VIDEO interface.

(3-3-5. Output Timing Signal Generation Section 95)

The output timing signal generation section 95 generates, in accordance with the rising/falling timing (0/1 period information) of each of the signals HSYNCI2_DEL, LENI2_DEL, and PENI2_DEL respectively inputted from the delay circuits 93a to 93c, signals HSYNC_M, LENI_M, and PENI2_M synchronized with the run image (ruled-line image) data LINE_M outputted from the main-scanning run determination section 94, and then outputs the signals HSYNC_M, LENI_M, and PENI2_M to the ruled-line information correction section 64.

(3-4. Ruled-line Information Correction Section 64)

The ruled-line information correction section 64 carries out the work of removing a character portion and an acnode portion from the run image data LINE_M, inputted from the main-scanning ruled-line extraction section 63, which contains ruled-line information.

As shown in FIG. 1, the ruled-line information correction section 64 includes a dilation/erosion process section 65, a filter process section 66, and a line information storage section 67. Further, the line information storage section 67 includes a previous-line run information storage buffer (hereinafter referred to as "LINEINFO_PRE") and a current-line run information storage buffer (hereinafter referred to as "LINEINFO_CUR"). It should be noted that each of the LINEINFO_PRE and the LINEINFO_CUR is a buffer memory of 1 bit/Word×8192 Word that is constituted by a memory element such as a SRAM.

The LINEINFO_PRE contains run image data LINE_M for the line that comes immediately before the line containing the target pixel. Further, the LINEINFO_CUR contains run image data LINE_M for the line including the target pixel.

Figures 14, 15:
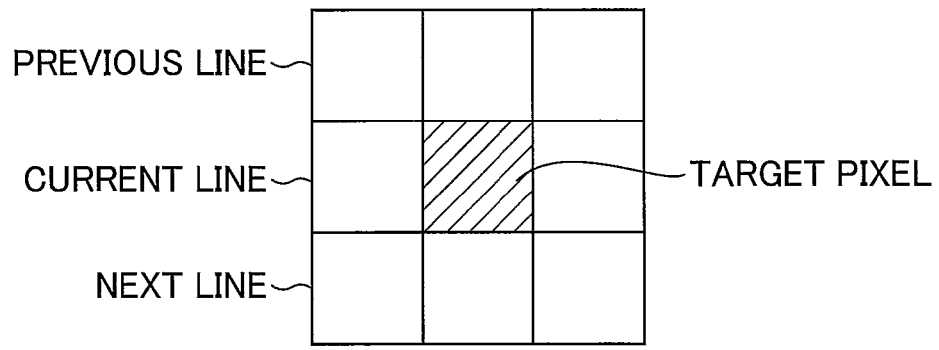
FIG. 14 is an explanatory diagram for explaining a dilation/erosion process that is performed in a ruled-line information correction section provided in the ruled-line extraction section shown in FIG. 1.

The dilation/erosion process section (dilation process section, erosion process section) 65 corrects the value of the target pixel in accordance with (i) a run image (stored in the LINEINFO_PRE) of the line that comes immediately before the line including the target pixel, (ii) a run image (stored in the LINEINFO_CUR) of the line including the target pixel, and (iii) a run image (inputted from the main-scanning ruled-line extraction section 63) of the line that comes immediately after the line including the target pixel, so as to remove a character portion and an acnode portion. Specifically, the dilation/erosion process section 65 performs, on each pixel, a process (dilation process) of referring to eight pixels surrounding the target pixel as shown in FIG. 14 and setting the value of the target pixel to 1 in cases where even one of the eight pixels is a black pixel (whose value is 1). Further, the dilation/erosion process section 65 performs, for each pixel, a process (erosion process) of, with respect to the run image finished with the dilation process, setting the value of the target pixel to 0 in cases where the eight pixels surrounding the target pixel include a white pixel (whose value is 0). This makes it possible to remove a character portion and an acnode portion from the run image.

The filter process section (edge enhancement process section, edge correction section) 66 performs a horizontal-and-vertical edge enhancement filter process intended to enhance a main-scanning run image and a sub-scanning run image. The horizontal-and-vertical edge enhancement filter process uses filter factors shown, for example, in FIGS. 15(a) and 15(b).

Moreover, the ruled-line information correction section 64 outputs the binary image data, which has been finished with the dilation/erosion process and the filter process, to the third data conversion section 54 as a signal DLINE, and outputs (passes) the run image data LINE_M, which has been inputted from the main-scanning ruled-line extraction section 63, to the third data conversion section 54 as a signal LINE without change (without performing any process). Further, the ruled-line information correction section 64 outputs (passes) the signals HSYNC_M, LEN_M, and PEN_M, which have been inputted from the main-scanning ruled-line extraction section 63, to the third data conversion section 54 as signals HSYNCO, LENO, and PENO, respectively, without change (without performing any process).

(3-5. Third Data Conversion Section 54)

The third data conversion section (VIDEO-to-DMA conversion section) 54 accumulates, up to a unit of DMA transfer, image data LINE and DLINE inputted from the ruled-line information correction section 64 via the VIDEO interface. For every unit of data accumulated for DMA transfer, the third data conversion section 54 outputs the data in sequence to a ruled-line image storage section (external memory) M2 via the DMA interface. It should be noted that the third data conversion section 54 starts operation at the time of output of LINE and DLINE corresponding to a line image for ya=0, and continues the operation until it finishes outputting LINE and DLINE corresponding to a line image for yb=(Y-1).

4. Summary of Embodiment 1

In the present embodiment, as described above, after writing BINIMG_DEL=0 into the RUNH address hcount_h[12:0] with respect to a non-edge-detected pixel in Step S2, the main-scanning ruled-line extraction section 63 sets the set value of cancel_run[0] to 1 in Step S9, i.e., sets a flag for determining that the target pixel is outside of a main-scanning run region.

Then, in Step S10, the main-scanning ruled-line extraction section 63 determines whether or not inline_h[0]=1, i.e., whether or not the pixel that comes immediately before the target pixel is within a main-scanning run region. In cases where inline_h[0]=1, the main-scanning ruled-line extraction section 63 determines in Step S11 whether or not GAP_INFO=1, i.e., whether or not the target pixel is a gap region.

Then, in cases where the main-scanning ruled-line extraction section 63 determines that the target pixel is a gap region (GAP_INFO=1), the main-scanning ruled-line extraction section 63 sets cancel_run[0] to 0 (indicating that the target pixel is within a main-scanning run region) in Step S12. On the other hand, in cases where the main-scanning ruled-line extraction section 63 determines that the target pixel is not a gap region (GAP_INFO=0), the main-scanning ruled-line extraction section 63 checks, in Step S13, RUNVHST-stored values corresponding to pixels falling within a range for determining a gap region (confirmation pixels), instead of immediately determining that the target pixel is outside of a main-scanning run region. That is, the main-scanning ruled-line extraction section 63 checks the presence or absence of a history of detection in the confirmation pixels of a run extending in the sub-scanning direction.

Then, in cases where the confirmation pixels include pixels whose RUNVHST-stored values are 1, i.e., pixels detected as a run extending in the sub-scanning direction, the main-scanning ruled-line extraction section 63 sets cancel_run[0] to 0 (indicating that the target pixel is within a main-scanning run region).

Thus, the present embodiment determines, in accordance with the result of determining in Step S11 whether or not GAP_INFO=1 and the result of detecting in Step S13 the presence or absence of a history of detection in the confirmation pixels of a run extending in the sub-scanning direction, whether or not the target pixel is within a main-scanning run region.

With this, for example, a blur, a break, or the like in a ruled-line portion that would be judged by the gap determination S11 alone as being outside of a main-scanning run region can be judged as being within a main-scanning run region. That is, the main-scanning run region can be judged as continuous.

In Step S13, the sub-scanning run information is referred to in determining whether or not the target pixel is within a main-scanning run region, and the sub-scanning run information is merely history information indicating whether or not a sub-scanning run of a size not less than a certain size has been detected in that address. As such, in terms of whether or not a main-scanning run being detected and a sub-scanning run corresponding to the sub-scanning run information intersect with each other, the sub-scanning run information cannot serve as information for determining whether or not the target pixel is within a main-scanning region.

Therefore, for example, in cases where a main-scanning ruled-line image supposed to be a single continuous line is computerized at the time of reading of an image in such a manner as to be partially cracked due to a defect, aged deterioration, or the like in a reading device (input device) and where the main-scanning run size of a portion of the dotted ruled line is smaller than run_h_th[9:0] as a result, the gap determination process of S11 is so insufficient that the main-scanning ruled-line image is overlooked as not being a ruled line. However, a combination of the gap process of S11 and Step S13 makes it possible to recognize the main-scanning ruled-line image as a single ruled-line, i.e., makes it possible to prevent the precision of determination of a main-scanning ruled-line from decreasing due to the performance of the reading device.

Figure 16:
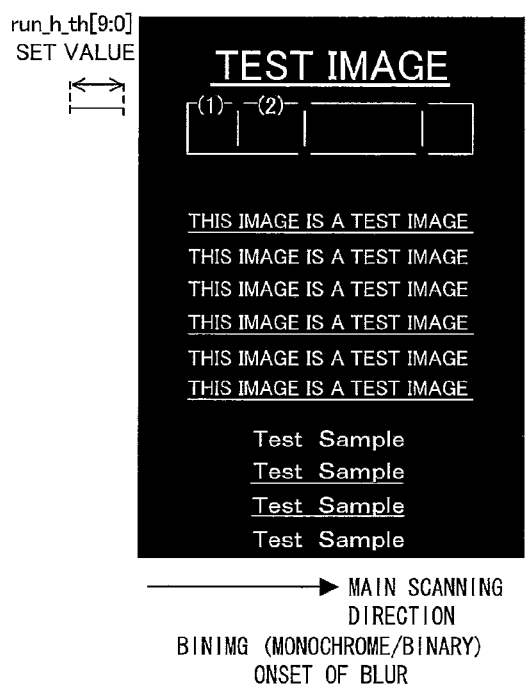
FIG. 16(a) is an explanatory diagram showing image data that is inputted to the main-scanning ruled-line extraction section shown in FIG. 12.
FIG. 16(b) is an explanatory diagram showing a process that is performed by the main-scanning ruled-line extraction section on the image data shown in FIG. 16(a).
FIG. 16(c) is an explanatory diagram showing image data that is generated by the process of FIG. 16(b).
Figure 16:
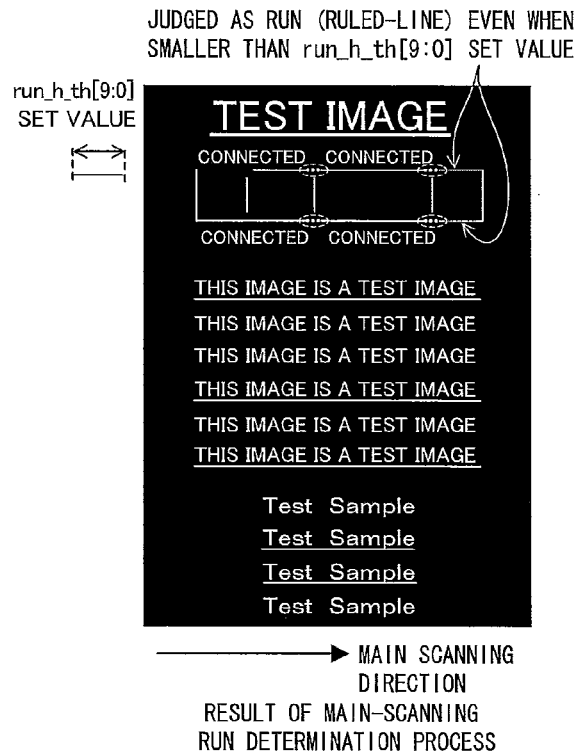
Figure 16:
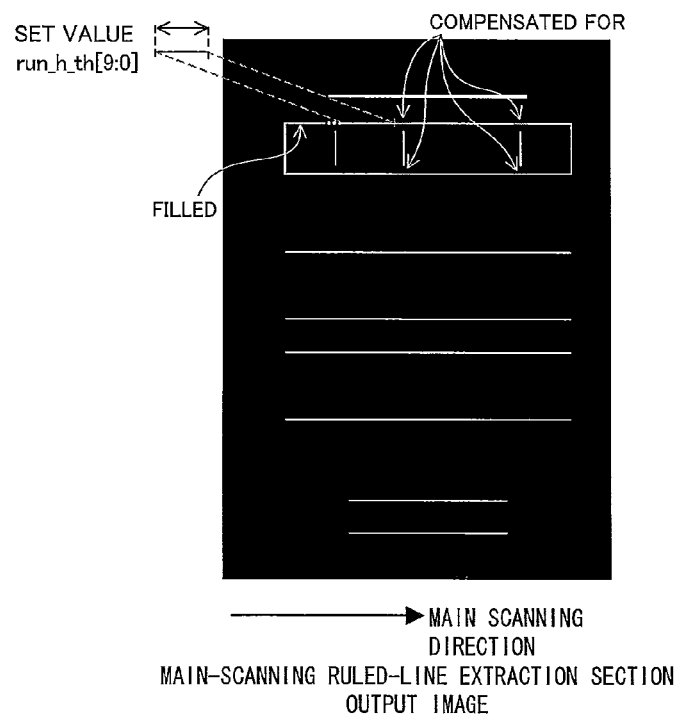

Further, according to the foregoing arrangement, by performing Step S7 (filling process) and Step S18 (gap-filling process) on BINIMG_DEL inputted from the main-scanning run determination section 94, plural fragments of a ruled line extending in the main scanning direction can be judged as a single ruled line without the need to intersect with a ruled line extending in the sub-scanning line. For example, even a main-scanning run that is fragmented and does not intersect with a sub-scanning run as in the case of a main-scanning run contained in the rectangular image BINIMG shown in FIG. 16(a) is processed as a single continuous main-scanning run shown in FIG. 16(b), and a main-scanning run image is stored in the RUNH as a single main-scanning run shown in FIG. 16(c).

Thus, the sub-scanning run history information (history storage information) stored in the RUNVHST of the sub-scanning ruled-line extraction section 62 is used as data for the process of correcting a gap region in a main-scanning run image.

In cases where the head of each line has a main-scanning run region of a certain size in a region where the set value of run_h_th[9:0] is not satisfied, i.e., in a region where inline_h[0]=1 is not established, Steps S11 and S13 are performed in the state where inline_h[0]=0. Therefore, in cases where Step S7 is not performed, such a main-scanning run region is not recognized.

In contrast, by performing Step S7, the region can be detected as a main-scanning run. It should be noted that the value of length[9:0], which is a size for performing a filling process, needs to be set higher than the main-scanning run threshold value run_h_th[9:0]. Further, the set value of run_h_th[9:0] only needs to be computed according to Formula (1) after the number of pixels that can be recognized by a user as a main-scanning run has been determined in accordance with paper size, resolution, and the like.

Further, in the process of performing this series of steps, extraction of a sub-scanning run image is performed independently in parallel with extraction of a main-scanning run image. For example, in cases where there exists a ruled line extending from the 0th to 99th lines of an input image at the point where the main-scanning pixel coordinate equals 50, Step S2 writes 1 into an address hcount_h[12:0]=50 in the RUNH from the 0th to 99th lines, and a run image extending in the sub-scanning direction is reconfigured when the input image is reconfigured as a binary image. On this occasion, as mentioned above, an image of a run extending in the main scanning direction and an image of a run extending in the sub-scanning direction are extracted completely independently of each other. Therefore, the run images can be both surely extracted regardless of how they are positioned with respect to each other (e.g., whether or not they intersect with each other).

Further, the present embodiment first preliminarily extracts information on a ruled line extending in the sub-scanning direction, and then uses the data to precisely extract a ruled line extending in the main scanning direction and a ruled line extending in the sub-scanning direction. On this occasion, the total number of image storage memories needed is only five, namely two memory buffers (RUNV and RUNVHST), with a maximum input-line width, for extracting a ruled line extending in the sub-scanning direction, one memory buffers (RUNH), with a maximum input-line width, for extracting a ruled line extending in the main scanning direction, and two memory buffers (LINEINFO_PRE and LINEINFO_CUR) for correcting ruled-line information. This makes it possible to make the number of memory buffers smaller than in a conventional image processing apparatus that performs a ruled-line extraction process. Further, each of the memory buffers only needs to be of such a size that data for a single line can be stored, and as such, can be constituted by a lower-capacity memory. This makes it possible to achieve cost reduction by reducing circuit size in comparison with a conventional image processing apparatus that performs a ruled-line extraction process, and to improve the precision with which ruled-line image information is recognized.

In the present embodiment, the compression process section 14 extracts, from input image data, a foreground layer composed of an image of a character or line drawing, and a ruled-line extraction process is performed in accordance with a result obtained by binarizing the foreground layer. However, the present invention is not limited to this. For example, it is possible to detect an edge from input image data and extract a ruled line from image data obtained by binarizing image data from which an edge has been detected. The edge extraction is not particularly limited in method, and it is possible to use a conventional publicly-known method using such a 3×3 filter, a Sobel filter, or the like shown, for example, in FIGS. 17(a) and 17(b). Further, the binarization is not particularly limited in method, and it is possible to use various conventional publicly-known methods. For example, in the case of 8-bit image data, it is possible to binarize the image data with the threshold value set at 128. Alternatively, it is possible to calculate the average of blocks each composed of a plurality of pixels and binarize the target pixel by using the average as a threshold value.

Further, although the present embodiment has described a case where the present invention is applied to a digital color multifunction printer, the present invention is not limited to such a target of application. For example, the present invention may be applied to a monochrome multifunction printer. Further, the present invention may be applied, for example, to a stand-alone facsimile communication apparatus, a copying machine, an image reading apparatus, as well as a multifunction printer.

Figure 18:
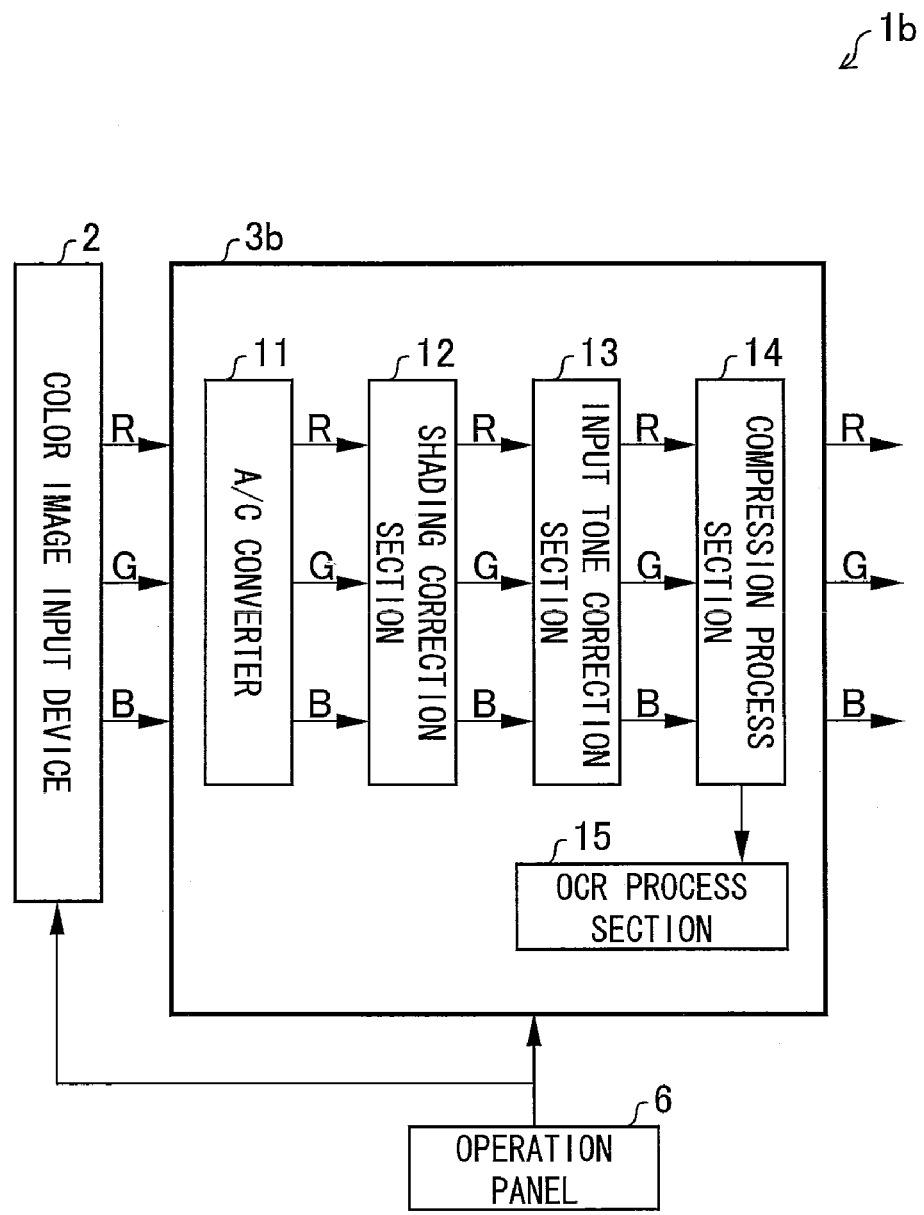
FIG. 18 is a block diagram schematically showing an arrangement of a modified example (image reading apparatus) of an image processing apparatus according to an embodiment of the present invention.

FIG. 18 is a block diagram showing an example arrangement in which the present invention is applied to an image reading apparatus (image processing apparatus, image reading apparatus) 1b.

As shown in FIG. 18, the image reading apparatus 1b includes a color image input device 2 and a color image processing apparatus 3b. The color image processing apparatus 3b includes an A/D converter 11, a shading correction section 12, an input tone correction section 13, a compression process section 14, an OCR process section 15, and a main control section (not shown), and the color image input device 2 and the color image processing apparatus 3b are connected to each other to constitute the image reading apparatus 1b as a whole. The A/D converter 11, the shading correction section 12, the input tone correction section 13, the compression process section 14, and the OCR process section 15 are substantially identical in arrangement and operation to their counterparts provided in the digital multifunction printer 1.

Embodiment 2

Another embodiment of the present invention is described. For convenience of explanation, members having the same functions as those described in Embodiment 1 are given the same reference numerals, and as such, are not described below. The present embodiment describes a case where a ledger-sheet recognition process (document matching process) is performed with use of a result of ruled-line information extraction.

Figure 19:
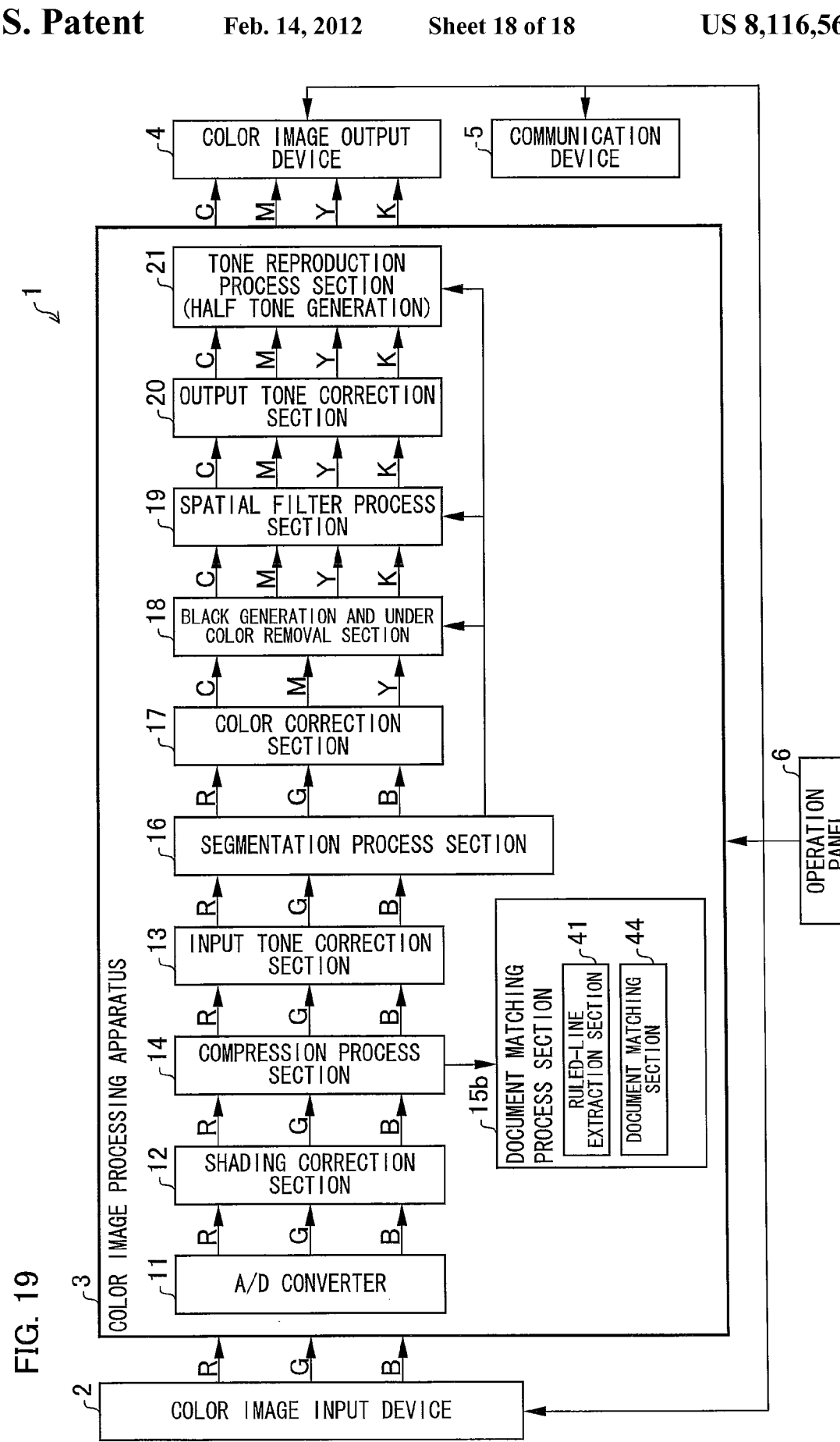
FIG. 19 is a block diagram schematically showing an arrangement of an image processing apparatus (image reading apparatus, image data output processing apparatus) according to another embodiment of the present invention.

FIG. 19 is a block diagram schematically showing an arrangement of a digital multifunction printer (image forming apparatus) 1c according to the present embodiment. As shown in FIG. 19, the digital multifunction printer 1c differs from the digital multifunction printer 1 of Embodiment 1 in that the compression process section 14 is provided between the shading correction section 12 and the input tone correction section 13 and has a document matching process section 15b connected thereto instead of the OCR process section 15. It should be noted that the digital multifunction printer 1c is arranged such that the shading correction section 12 is responsible for adjustment of color balance and conversion into a density signal and the input tone correction section 13 is responsible for removing background density and adjusting image quality such as contrast.

As shown in FIG. 19, the document matching process section 15b includes a ruled-line extraction section 41 and a document matching section 44. The ruled-line extraction section is identical in arrangement and function to its counterpart of Embodiment 1.

The document matching section (document features extraction section, matching process section) 44 matches a document image and ruled-line image information of ledger-sheet data, stored in advance in a storage section (not shown) such as a hard disk, which has a predetermined template format such as a license, a resident register, or a family register, and then transmits a result of the matching to the main control section. In performing the matching, the document matching section 44 uses ruled-line information (DLINE signal) generated in the ruled-line extraction section 41 in accordance with document image data (matching target image).

The matching process is not particularly limited in method; however, the present embodiment uses a method described in Patent Document 1.

Specifically, first, after a start point of tracing (e.g., an edge of a run image) has been detected by raster-scanning a ruled-line image by a contour extraction process, a closed curve of graphic limits is traced clockwise or counterclockwise from the start point of tracing. Information on such a contour as extracted by tracing a closed curve is stored as a sequence of coordinate points.

Next, based on the contour data thus extracted, feature points, such as crossed portions and angular portions, of the image are detected, and a frame is extracted from a combination of the point sequences. Then, a drawing tangential to the input frame information is computed.

Next, central coordinate data for each piece of frame data is computed. For example, if the frame coordinates are (x0, y0), (x1, y1), (x2, y2), and (x3, y3) starting from the bottom left corner, the point of diagonal cross is given by (cx, cy).

Next, assuming that the difference between the upper left coordinates of a frame in a template format stored in advance and the upper left coordinates on the ruled-line image is (dx, dy), the frame of the stored template format and the frame of the ruled-line image are aligned with each other by correcting the center locations of the frames.

Next, the frame data for the stored template format and the frame data for the ruled-line image are associated with each other. For example, assuming that the central coordinates of the frame data on the stored template format are (tcx, tcy) and the central coordinates of the frame data on the ruled-line image are (icx, icy), the distance D between them is given by $D=(icx-tcx)^2+(icy-tcy)^2$.

Then, the number of frames that, among the frames on the ruled-line image, correspond to the frames on the stored template format is counted. Specifically, the preset threshold value dth is used, and in cases where D<dth, it is determined that there is correspondence between the frames on the ruled-line image and the frames on the stored template format. In cases where D≧dth, it is determined that there is no such correspondence. Then, the similarity is computed by dividing the number of corresponding frames by the number of frames on the stored template format (Similarity=Number of Corresponding Frames/Number of Frames on Stored Template Format). Then, by making a comparison between the similarity and the preset similarity determination threshold value, it is determined whether or not the ruled-line image (document image) and the stored template format are similar to each other (presence or absence of matching).

As described above, the present embodiment performs the document matching process with use of ruled-line image information (DLINE signal) generated by the ruled-line extraction section 41. This makes it possible to perform the document matching process in accordance with ruled-line image information extracted with high precision, thereby making it possible to improve the precision of the document matching process.

It should be noted that the main control section of the digital multifunction printer 1c or another device connected communicably to the digital multifunction printer 1c may use a result of the document matching process to prohibit or restrict execution of a process (e.g., printing, saving of electronic data, transmission) with respect to document image data.

For example, it may be that: ruled-line image information of ledger-sheet data having a predetermined template format such as a license, a resident register, or a family register is stored in advance in the digital multifunction printer (image forming apparatus) 1c or a server; in cases where the digital multifunction printer 1c is instructed to execute a process (e.g., printing, saving of electronic data, transmission) with respect to document image data, the digital multifunction printer 1c extracts ruled-line image information from the document image data, performs a process of matching the extracted ruled-line image information and the preliminarily stored ruled-line image information such as a license, a resident register, or a family register (matching process); and in cases where it is determined as a result of the matching that there is correspondence, a process of prohibiting or restricting execution of a process (e.g., printing, saving of electronic data, transmission) with respect to document image data or of putting predetermined restrictions is performed, for example.

More specifically, for example, in cases where a user scans his/her original license with an image forming apparatus to make a copy of the license, a ruled-line image is extracted from image data obtained by scanning the license. Then, the ruled-line image information thus extracted is matched in sequence with template-format ruled-line image information stored in storage means such as a hard disk provided in the image forming apparatus. Then, it is determined as a result of the matching process that the image data is image data obtained by the user's scanning the license, it is possible to perform a security process, for example, of superimposing a watermark such as "DUPLICATE" or "COPY" onto the image data in forming an image of the image data, or of canceling (prohibiting) the process of forming an image.

Although the compression process section 14 is provided between the shading correction section 12 and the input tone correction section 13, the present invention is not limited to this. The compression process section 14 may be provided between the input tone correction section 13 and the segmentation process section 16 as in the case of Embodiment 1.

In the present embodiment, the compression process section 14 extracts, from input image data, a foreground layer composed of an image of a character or line drawing, and a ruled-line extraction process is performed in accordance with a result obtained by binarizing the foreground layer. However, the present invention is not limited to this. For example, it is possible to detect an edge from input image data and extract a ruled line from image data obtained by binarizing image data from which an edge has been detected. In this case, it is only necessary that the compression process section 14 be replaced with a processing section (not shown) for performing edge detection and binarization.

Further, although the present embodiment has described a case where the present invention is applied to a digital color multifunction printer, the present invention is not limited to such a target of application. For example, the present invention may be applied to a monochrome multifunction printer. Further, the present invention may be applied, for example, to a stand-alone facsimile communication apparatus, a copying machine, an image reading apparatus, as well as a multifunction printer. For example, in the image reading apparatus 1b shown in FIG. 18, the OCR process section 15 may be replaced with the document matching process section 15b. In this case, for example, image data and a signal representing a result of document matching are inputted from the image reading apparatus 1b to an image forming apparatus connected via a computer or a network, and a process based on the result of document matching is performed.

Further, in each of the embodiments described above, each section of the image processing apparatus 3 provided in each of the digital multifunction printer 1 and 1c and the image reading apparatus 1b (e.g., the compression process section 14, the OCR process section 15, and the document matching process section 15b) may be realized by software with use of a processor such as a CPU. That is, each of the digital multifunction printer 1 and 1c and the image reading apparatus 1b include: a CPU for executing an instruction of a control program for realizing various functions; a ROM in which the program has been stored; a RAM for expanding the program; and a storage device (storage medium), such as a memory, in which the program and various data are stored. The object of the present invention can also be achieved by providing each of the digital multifunction printer 1 and 1c and the image reading apparatus 1b with a storage medium in which a program code (executable program, intermediate code, or source program) of the control program of each of the digital multifunction printer 1 and 1c and the image reading apparatus 1b has been stored in a computer readable manner, and by causing the computer (CPU or MPU) to read and execute the program code stored in the storage medium, the program code serving as software for realizing the aforementioned functions.

Examples of the storage medium include: a tape such as a magnetic tape or a cassette tape; a magnetic disk such as a floppy® disk or a hard disk; an optical disk such as a CD-ROM, an MO, an MD, a DVD, or a CD-R; a card such as an IC card (inclusive of a memory card) or an optical card; and a semiconductor memory such as a mask ROM, an EPROM, an EEPROM, or a flash ROM.

Further, each of the digital multifunction printer 1 and 1c and the image reading apparatus 1b may be arranged so as to be connectable to a communication network so that the program code is supplied to each of the digital multifunction printer 1 and 1c and the image reading apparatus 1b through the communication network. The communication network is not particularly limited. Examples of the communication network include, but are not particularly limited to, the Internet, an intranet, an extranet, a LAN (local area network), an ISDN (integrated services digital network), a VAN (value added network), a CATV (cable TV) communication network, a virtual private network, a telephone network, a mobile communication network, and a satellite communication network. Further, usable examples of a transmission medium that constitutes the communication network include, but are not particularly limited to, a cable medium such as IEEE 1394, a USB, power line communication, a cable TV line, a telephone line, or an ADSL line and a wireless medium such as IrDA, infrared rays used for a remote controller, Bluetooth®, IEEE 802.11, HDR (High Data Rate), a mobile phone network, satellite connection, or a terrestrial digital network. It should be noted that the present invention can also be realized in the form of a computer data signal realized by electronic transmission of the program code and embedded in a carrier wave.

Furthermore, each block of each of the digital multifunction printer 1 and 1*c* and the image reading apparatus 1*b* may be realized by hardware logic. Each block of each of the digital multifunction printer 1 and 1*c* and the image reading apparatus 1*b* may be a combination of hardware performing some of the processes and the computing means controlling the hardware and executing program code for the other processes.

The computer system of the present invention may be composed of: an image input apparatus such as a flat bed scanner, a film scanner, and a digital camera; a computer loaded with a predetermined program to execute various processes such as the image processing; an image display apparatus, such as a CRT display and a liquid crystal display, for displaying a result of the process by the computer; and an image forming apparatus, such as a printer, for outputting a result of the process by the computer on a sheet of paper etc. Furthermore, a network card or a modem may be provided as communication means for connecting a server etc. via a network.

An image processing apparatus of the present invention is an image processing apparatus for extracting, in accordance with binary image data of a document image, a ruled-line image contained in the document image, the image processing apparatus including: a pixel value determination section for determining whether a target pixel of the binary image data is a black pixel or a white pixel; a counting section for counting the number of black pixels connected one after another upstream in a main scanning direction with respect to the target pixel of the binary image data; and a ruled-line image data generation section for, when the target pixel of the binary image data is a black pixel and when a value counted for the target pixel is not less than a main-scanning run determination threshold value that has been set in advance, generating ruled-line image data by correcting, to pixel values corresponding to black pixels, pixel values of a predetermined number of pixels connected to the target pixel upstream in the main scanning direction.

According to the foregoing arrangement, the pixel value determination section determines whether a target pixel of the binary image data is a black pixel or a white pixel, and the counting section counts the number of black pixels connected one after another upstream in a main scanning direction with respect to the target pixel of the binary image data. Then, when the target pixel of the binary image data is a black pixel and when a value counted for the target pixel is not less than a main-scanning run determination threshold value that has been set in advance, the ruled-line image data generation section generates ruled-line image data by correcting, to pixel values corresponding to black pixels, pixel values of a predetermined number of pixels connected to the target pixel upstream in the main scanning direction.

This makes it possible that even when a ruled line extending in the main scanning has a blur, a break, or the like due to a reading error or the like caused at the time of image reading, ruled-line image data is prepared with the blur, the break, or the like made up for. That is, a ruled-line image supposed to be a single ruled line but fragmented due to a reading error or the like can be corrected to be a single ruled-line image. This makes it possible to perform a ruled-line extraction process with high precision. Further, since it is not necessary to scan the document image in various directions as in the case of the technique of Patent Document 2, it is possible to make a reduction in circuit size of an image processing apparatus in comparison with the arrangement of Patent Document 2.

Further, the image processing apparatus of the present invention may be arranged so as to further include: a dilation process section for, when eight pixels surrounding a target pixel of the ruled-line image data include a black pixel, performing a dilation process of correcting a pixel value of the target pixel to a pixel value corresponding to a black pixel; and an erosion process section for, when the eight pixel surrounding the target pixel of the ruled-line image data finished with the dilation process include a white pixel, performing an erosion process of correcting the pixel value of the target pixel to a pixel value corresponding to a white pixel.

The foregoing arrangement performs the dilation process and the erosion process on the ruled-line image data, thereby removing a character or an acnode (i.e., a black pixel isolated from the ruled-line image) and making up for a white pixel within the ruled line.

Further, the image processing apparatus of the present invention may be arranged so as to further include an edge correction section for performing an edge enhancement process on the ruled-line image data finished with the erosion process.

The foregoing arrangement performs an edge enhancement process on the ruled-line image data finished with the erosion process, thereby expressing the ruled-line image more clearly.

Further, the image processing apparatus of the present invention may be arranged such that: when the target pixel of the binary image data is a white pixel, the ruled-line image data generation section determines whether a previous target pixel is a white pixel or a black pixel, the previous target pixel being a pixel connected to the target pixel of the ruled-line image data upstream in the main scanning direction; when the ruled-line image data generation section determines that the previous target pixel of the ruled-line image data is a white pixel, the ruled-line image data generation section causes a pixel value of the target pixel of the ruled-line image data to be a pixel value corresponding to a white pixel; and when the ruled-line image data generation section determines that the previous target pixel of the ruled-line image data is a black pixel, the ruled-line image data generation section determines whether or not a predetermined number of pixels connected to the target pixel of the ruled-line image data upstream in the main scanning direction include a black pixel, and if so, causes the pixel value of the target pixel of the ruled-line image data to be a pixel value corresponding to a black pixel.

According to the foregoing arrangement, even when the target pixel of the binary image data is a white pixel, the ruled-line image data generation causes the pixel value of the target pixel of the ruled-line image data to be a pixel value corresponding to a black pixel, provided the previous target pixel of the ruled-line image data is a black pixel and a predetermined number of pixels connected to the target pixel of the ruled-line image data upstream in the main scanning direction include a black pixel. This makes it possible that even when a ruled line extending in the main scanning has a blur, a break, or the like due to a reading error or the like caused at the time of image reading, ruled-line image data is prepared with the blur, the break, or the like made up for. This makes it possible to perform a ruled-line extraction process with high precision.

Further, the image processing apparatus of the present invention may be arranged so as to further include a second counting section for counting, for each sequence of pixels extending in a sub-scanning direction in the binary image data, the number of black pixels connected one after another in the sub-scanning direction, wherein: when the ruled-line image data generation section determines that the predetermined number of pixel do not include a black pixel and when a value counted by the second counting section for a sequence of pixels to which the target pixel belongs is not less than a sub-scanning run determination threshold value that has been set in advance, the ruled-line image data generation section causes the pixel value of the target pixel of the ruled-line image data to be a pixel value corresponding to a black pixel; and when the ruled-line image data generation section determines that the predetermined number of pixels do not include a black pixel and when the value counted by the second counting section for the sequence of pixels to which the target pixel belongs is less than the sub-scanning run determination threshold value, the ruled-line image data generation section causes the pixel value of the target pixel of the ruled-line image data to be a pixel value corresponding to a white pixel.

According to the foregoing arrangement, even when a ruled line extending in the main scanning has a blur, a break, or the like due to a reading error or the like caused at the time of image reading, ruled-line image data can be prepared with the blur, the break, or the like made up for as black pixels, provided a sequence of pixels corresponding to the blur, the break, or the like includes a run image (i.e., an image where the number of black pixels connected one after another in the sub-scanning direction is not less than the sub-scanning run determination threshold value).

Further, the image processing apparatus of the present invention may be arranged so as to further include: an image data storage section in which to store the binary image data; first and second data readout sections for reading out the binary image data from the image data storage section for each line extending along the main scanning direction; and a sub-scanning run history storage section in which to store information indicating whether or not a value counted by the second counting section for each sequence of pixels is not less than a sub-scanning run determination threshold value that has been set in advance, wherein: the second counting section performs the counting in accordance with the binary image data read out for each line by the first data readout section; the counting section performs the counting in accordance with the binary image data read out for each line by the second data readout section; the second data readout section starts readout of the binary image data at a predetermined number of lines following the lines where the first data reading section starts; and the ruled-line image data generation section determines, in accordance with the information stored in the sub-scanning run history storage section, whether or not a value counted by the second counting section for the sequence of pixels to which the target pixel belongs is not less than a sub-scanning run determination threshold value that has been set in advance.

According to the foregoing arrangement, the second data readout section starts readout of the binary image data at a predetermined number of lines following the lines where the first data reading section starts. Therefore, when the ruled-line image data generation section determines whether or not a value counted by the second counting section for the sequence of pixels to which the target pixel belongs is not less than the sub-scanning run determination threshold value, the sub-scanning run history storage section already contains information indicating a result of comparison between (i) values counted by the second counting section for at least a predetermined number of lines upstream in the sub-scanning direction with respect to the target pixel among the sequence of pixels to which the target pixel belongs and (ii) the sub-scanning run determination threshold value. Therefore, since the determination can be made with use of the information, the processing time can be shortened in comparison with a case where the determination is made after making for every line and every pixel a comparison between a value counted by the second counting section and the sub-scanning run determination threshold value. Further, since it is only necessary to store, in the sub-scanning run history storage section, information indicating whether a value counted for each sequence of pixels is not less than the sub-scanning run determination threshold value, it is not necessary to store a result of comparison between the counted number of pixels and the sub-scanning run determination threshold value for every line. Such an arrangement can be realized with use of low-capacity storage means.

Further, the image processing apparatus of the present invention may be arranged so as to further include: a ruled-line removal section for removing, from the binary image data, a ruled-line image corresponding to the ruled-line image data; and a character analysis section for performing a character recognition process on a character image contained in the binary image data from which the ruled-line image has been removed.

The foregoing arrangement makes it possible to extract a ruled-line image with high precision and perform a character recognition process in accordance with a result obtained by removing the ruled-line image from the binary image data. This makes it possible to improve the precision of the character recognition process.

Further, the image processing apparatus of the present invention may be arranged so as to further include: a reference ruled-line information storage section in which to store reference ruled-line information serving as features of a ruled line contained in a reference image; a document features extraction section for extracting features of the ruled-line image data corresponding to the document image; and a matching process section for performing, in accordance with the reference ruled-line information and the features of the ruled-line image data extracted by the document features extraction section, a process of matching the document image and the reference image.

The foregoing arrangement makes it possible to extract a ruled-line image of a document image with high precision and to perform, in accordance with features of the ruled-line image thus extracted and features of a ruled line contained in a reference image, a process of matching the document image and the reference image. This makes it possible to improve the precision of the matching process.

An image reading apparatus of the present invention is arranged so as to include an image input section for obtaining image data of a document image by reading the document image; and an image processing apparatus as set forth in claim 1, the image processing apparatus generating ruled-line image data of the document image in accordance with the image data of the document image obtained by the image input section.

The foregoing arrangement makes it possible to extract a ruled-line image with high precision from the image data of the document image obtained by the image input section.

An image data output processing apparatus of the present invention is an image data output processing apparatus for performing an output process on image data, the image data output processing apparatus including: an image processing apparatus as set forth in claim 8; and an output process control section for controlling an output process for image data of a document image in accordance with a result of the matching process in the image processing apparatus. It should be noted that the image data output processing apparatus may form on a recording material an image corresponding to image data, may transmit image data to a predetermined destination, or may save image data to a predetermined destination.

The foregoing arrangement makes it possible to perform with high precision a process of matching a document image and a reference image, thus making it possible to control an output process with high precision.

An image processing method of the present invention is an image processing method for extracting, in accordance with binary image data of a document image, a ruled-line image contained in the document image, the image processing method including: a pixel value determination step of determining whether a target pixel of the binary image data is a black pixel or a white pixel; a counting step of counting the number of black pixels connected one after another upstream in a main scanning direction with respect to the target pixel of the binary image data; and a ruled-line image data generation step of, when the target pixel of the binary image data is a black pixel and when a value counted for the target pixel is not less than a main-scanning run determination threshold value that has been set in advance, generating ruled-line image data by correcting, to pixel values corresponding to black pixels, pixel values of a predetermined number of pixels connected to the target pixel upstream in the main scanning direction.

According to the foregoing method, it is determined in the pixel value determination step whether a target pixel of the binary image data is a black pixel or a white pixel, and the number of black pixels connected one after another upstream in a main scanning direction with respect to the target pixel of the binary image data is counted in the counting step. Then, in the ruled-line image data generation step, when the target pixel of the binary image data is a black pixel and when a value counted for the target pixel is not less than a main-scanning run determination threshold value that has been set in advance, ruled-line image data is generated by correcting, to pixel values corresponding to black pixels, pixel values of a predetermined number of pixels connected to the target pixel upstream in the main scanning direction.

This makes it possible that even when a ruled line extending in the main scanning has a blur, a break, or the like due to a reading error or the like caused at the time of image reading, ruled-line image data is prepared with the blur, the break, or the like made up for. That is, a ruled-line image supposed to be a single ruled line but fragmented due to a reading error or the like can be corrected to be a single ruled-line image. This makes it possible to perform a ruled-line extraction process with high precision. Further, since it is not necessary to scan the document image in various directions as in the case of the technique of Patent Document 2, it is possible to make a reduction in circuit size of an image processing apparatus in comparison with the arrangement of Patent Document 2.

The concrete embodiments or examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing apparatus for extracting, in accordance with binary image data of a document image, a ruled-line image contained in the document image, the image processing apparatus comprising:
    a pixel value determination section for determining whether a target pixel of the binary image data is a black pixel or a white pixel;
    a counting section for counting the number of black pixels connected one after another upstream in a main scanning direction with respect to the target pixel of the binary image data;
    a ruled-line image data generation section for, when the target pixel of the binary image data is a black pixel and when a value counted for the target pixel is not less than a main-scanning run determination threshold value that has been set in advance, generating ruled-line image data by correcting, to pixel values corresponding to black pixels, pixel values of a predetermined number of pixels connected to the target pixel upstream in the main scanning direction; and
    a dilation process section for, when eight pixels surrounding a target pixel of the ruled-line image data include a black pixel, performing a dilation process of correcting a pixel value of the target pixel to a pixel value corresponding to a black pixel; and
    an erosion process section for, when the eight pixel surrounding the target pixel of the ruled-line image data finished with the dilation process include a white pixel, performing an erosion process of correcting the pixel value of the target pixel to a pixel value corresponding to a white pixel.

2. The image processing apparatus as set forth in claim 1, further comprising an edge correction section for performing an edge enhancement process on the ruled-line image data finished with the erosion process.

3. The image processing apparatus as set forth in claim 1, further comprising:
    a ruled-line removal section for removing, from the binary image data, a ruled-line image corresponding to the ruled-line image data; and
    a character analysis section for performing a character recognition process on a character image contained in the binary image data from which the ruled-line image has been removed.

4. An image reading apparatus comprising:
    an image input section for obtaining image data of a document image by reading the document image; and
    an image processing apparatus as set forth in claim 1,
    the image processing apparatus generating ruled-line image data of the document image in accordance with the image data of the document image obtained by the image input section.

5. An image data output processing apparatus for performing an output of image data, the image data output processing apparatus comprising:
    an image processing apparatus as set forth in claim 1; and
    an output process control section for controlling an output process for image data of a document image in accordance with a result of the matching process in the image processing apparatus.

6. An image processing apparatus for extracting, in accordance with binary image data of a document image, a ruled-line image contained in the document image, the image processing apparatus comprising:
    a pixel value determination section for determining whether a target pixel of the binary image data is a black pixel or a white pixel;
    a counting section for counting the number of black pixels connected one after another upstream in a main scanning direction with respect to the target pixel of the binary image data; and
    a ruled-line image data generation section for, when the target pixel of the binary image data is a black pixel and when a value counted for the target pixel is not less than a main-scanning run determination threshold value that has been set in advance, generating ruled-line image data by correcting, to pixel values corresponding to black pixels, pixel values of a predetermined number of pixels connected to the target pixel upstream in the main scanning direction; wherein:

when the target pixel of the binary image data is a white pixel, the ruled-line image data generation section determines whether a previous target pixel is a white pixel or a black pixel, the previous target pixel being a pixel connected to the target pixel of the ruled-line image data upstream in the main scanning direction;

when the ruled-line image data generation section determines that the previous target pixel of the ruled-line image data is a white pixel, the ruled-line image data generation section causes a pixel value of the target pixel of the ruled-line image data to be a pixel value corresponding to a white pixel; and when the ruled-line image data generation section determines that the previous target pixel of the ruled-line image data is a black pixel, the ruled-line image data generation section determines whether or not a predetermined number of pixels connected to the target pixel of the ruled-line image data upstream in the main scanning direction include a black pixel, and if so, causes the pixel value of the target pixel of the ruled-line image data to be a pixel value corresponding to a black pixel.

7. The image processing apparatus as set forth in claim 6, further comprising a second counting section for counting, for each sequence of pixels extending in a sub-scanning direction in the binary image data, the number of black pixels connected one after another in the sub-scanning direction, wherein:

when the ruled-line image data generation section determines that the predetermined number of pixels do not include a black pixel and when a value counted by the second counting section for a sequence of pixels to which the target pixel belongs is not less than a sub-scanning run determination threshold value that has been set in advance, the ruled-line image data generation section causes the pixel value of the target pixel of the ruled-line image data to be a pixel value corresponding to a black pixel; and when the ruled-line image data generation section determines that the predetermined number of pixels do not include a black pixel and when the value counted by the second counting section for the sequence of pixels to which the target pixel belongs is less than the sub-scanning run determination threshold value, the ruled-line image data generation section causes the pixel value of the target pixel of the ruled-line image data to be a pixel value corresponding to a white pixel.

8. The image processing apparatus as set forth in claim 5, further comprising:

an image data storage section in which to store the binary image data;

first and second data readout sections for reading out the binary image data from the image data storage section for each line extending along the main scanning direction; and a sub-scanning run history storage section in which to store information indicating whether or not a value counted by the second counting section for each sequence of pixels is not less than a sub-scanning run determination threshold value that has been set in advance, wherein:

the second counting section performs the counting in accordance with the binary image data read out for each line by the first data readout section;

the counting section performs the counting in accordance with the binary image data read out for each line by the second data readout section;

the second data readout section starts readout of the binary image data at a predetermined number of lines following the lines where the first data reading section starts; and the ruled-line image data generation section determines, in accordance with the information stored in the sub-scanning run history storage section, whether or not a value counted by the second counting section for the sequence of pixels to which the target pixel belongs is not less than a sub-scanning run determination threshold value that has been set in advance.

9. An image processing apparatus for extracting, in accordance with binary image data of a document image, a ruled-line image contained in the document image, the image processing apparatus comprising:

a pixel value determination section for determining whether a target pixel of the binary image data is a black pixel or a white pixel;

a counting section for counting the number of black pixels connected one after another upstream in a main scanning direction with respect to the target pixel of the binary image data;

a ruled-line image data generation section for, when the target pixel of the binary image data is a black pixel and when a value counted for the target pixel is not less than a main-scanning run determination threshold value that has been set in advance, generating ruled-line image data by correcting, to pixel values corresponding to black pixels, pixel values of a predetermined number of pixels connected to the target pixel upstream in the main scanning direction; and a reference ruled-line information storage section in which to store reference ruled-line information serving as features of a ruled line contained in a reference image;

a document features extraction section for extracting features of the ruled-line image data corresponding to the document image; and a matching process section for performing, in accordance with the reference ruled-line information and the features of the ruled-line image data extracted by the document features extraction section, a process of matching the document image and the reference image.

10. An image processing method for extracting, in accordance with binary image data of a document image, a ruled-line image contained in the document image, the image processing method comprising:

a pixel value determination step of determining whether a target pixel of the binary image data is a black pixel or a white pixel;

a counting step of counting the number of black pixels connected one after another upstream in a main scanning direction with respect to the target pixel of the binary image data;

a ruled-line image data generation step of, when the target pixel of the binary image data is a black pixel and when a value counted for the target pixel is not less than a main-scanning run determination threshold value that has been set in advance, generating ruled-line image data by correcting, to pixel values corresponding to black pixels, pixel values of a predetermined number of pixels connected to the target pixel upstream in the main scanning direction;

a dilation process section of, when eight pixels surrounding a target pixel of the ruled-line image data include a black pixel, performing a dilation process of correcting a pixel value of the target pixel to a pixel value corresponding to a black pixel; and an erosion process section of, when the eight pixel surrounding the target pixel of the ruled-line image data finished with the dilation process include a white pixel, performing an erosion process of correcting the pixel value of the target pixel to a pixel value corresponding to a white pixel.

* * * * *